United States Patent [19]
Kojima

[11] Patent Number: 5,745,967
[45] Date of Patent: May 5, 1998

[54] TURRET HEAD DEVICE FOR MACHINE TOOL

[75] Inventor: Masakazu Kojima, Shinjuku-ku, Japan

[73] Assignee: Dyadic Systems Co., Ltd., Ishikawa-ken, Japan

[21] Appl. No.: 721,764

[22] Filed: Sep. 25, 1996

[30] Foreign Application Priority Data

Sep. 25, 1995 [JP] Japan ..................... 7-246070
Jun. 21, 1996 [JP] Japan ..................... 8-162034

[51] Int. Cl.⁶ ..................................... B23B 29/32
[52] U.S. Cl. ................ 29/40; 29/48.5 R; 82/159; 408/35; 475/903
[58] Field of Search ................. 29/39, 40, 46; 408/35; 82/159; 74/813 R, 816, 825; 475/269, 295, 903

[56] References Cited

U.S. PATENT DOCUMENTS

| | | | |
|---|---|---|---|
| 3,590,673 | 7/1971 | Foll et al. | 74/826 X |
| 4,443,929 | 4/1984 | Bayer et al. | 29/40 |
| 4,847,960 | 7/1989 | Hafla et al. | 29/40 |
| 4,944,198 | 7/1990 | Natale et al. | 29/48.5 R |
| 5,455,993 | 10/1995 | Link et al. | 29/40 |

FOREIGN PATENT DOCUMENTS

| | | |
|---|---|---|
| 0 214 090 A1 | 3/1987 | European Pat. Off. |
| 0 299 556 A2 | 1/1989 | European Pat. Off. |
| 0 517 387 A2 | 12/1992 | European Pat. Off. |
| 0 642 884 A1 | 3/1995 | European Pat. Off. |
| 0 343 334 A2 | 11/1989 | Germany. |
| 4235095 | 4/1994 | Germany ........ 29/40 |
| 665 585 A5 | 5/1988 | Switzerland. |
| 2 104 807 | 3/1983 | United Kingdom. |
| 2 126 134 | 3/1984 | United Kingdom. |

*Primary Examiner*—William R. Briggs
*Attorney, Agent, or Firm*—Fish & Richardson P.C.

[57] ABSTRACT

A turret head device for machine tool comprises a housing; a motor mounted on a rear surface of said housing; a first and second planetary gear mechanisms, both integrated into the housing; a turret for mounting tools; and a tool driving shaft integrated into the turret.

Wherein said turret is connected with said motor through said first and second planetary gear mechanisms and the tool driving shaft is connected with the motor through the first planetary gear mechanism.

13 Claims, 23 Drawing Sheets

FIG.21

| ITEMS | | COMBINATIONS | | | | | | | | | | | |
|---|---|---|---|---|---|---|---|---|---|---|---|---|---|
| TOOL DRIVING SHAFT S1 | ABSENT (FIG.9) | ○ | | | | | | | | | | | |
| | PRESENT (FIGS.1,10,14,18) | | | | | ○ | ○ | ○ | ○ | ○ | ○ | ○ | ○ |
| ARRANGEMENT OF AUXILIARY SHAFT 52 | CO-AXIAL (FIGS.1,10,14) | | | ○ | | | | ○ | ○ | | ○ | ○ | ○ |
| | PARALLEL (FIG.18) | | | | ○ | | | | | ○ | | ○ | ○ |
| ARRANGEMENT OF PLANETARY GEAR MECHANISMS 20,30 | SIMPLE CASCADE (FIGS.10,18) | | | | ○ | ○ | | | ○ | ○ | | ○ | ○ |
| | COMPOUND CASCADE (FIGS.1,14) | ○ | | | | | ○ | ○ | | | ○ | ○ | ○ |
| CONTROLLED ITEMS BY MODE CHANGE | R/G 24 (FIG.18) | | | ○ | | | | | ○ | ○ | | ○ | ○ |
| | R/G 34 (FIGS.1,10,14) | | | | ○ | ○ | ○ | ○ | | | ○ | ○ | ○ |
| CONTROLLED MECHANISMS BY MODE CHANGE | CL 38 (FIGS.1,10) | | | | | ○ | | ○ | | ○ | ○ | ○ | ○ |
| | LOCK PIN 18 (FIGS.14,18) | | | | ○ | | ○ | | ○ | | ○ | ○ | ○ |
| SPEED CHANGE GEAR MECHANISM | ABSENT (FIGS.9,14,18) | ○ | | | ○ | | ○ | | ○ | | ○ | ○ | ○ |
| | PRESENT (FIGS.1,10) | | | | | ○ | | ○ | | ○ | ○ | ○ | ○ |

TURRET HEAD DEVICE FOR MACHINE TOOL

BACKGROUND OF THE INVENTION AND RELATED ART STATEMENT

This invention relates to a turret head device for machine tools such as lathes, which allows the machine to accommodate a plurality of tools to use them by selecting one after another.

Regarding machine tools such as lathes, a turret head device is used from time to time to automatically carry out a complicated machining process with minimum set-up time and machining time by changing a plurality of tools one after another.

This kind of device is equipped with a turning turret that can be stopped by positioning at every predetermined turning angle, and each one tool of different types is mounted at each stop position (hereinafter referred to as "tool position") on the circumferential surface of the turret. The device can quickly select a specified tool by turning the turret to machine the workpiece. Typical tools are stationary ones to be fixed to the turret and the tool carries out the specified machining by being brought in contact with the turning workpiece. However, the tool itself requires to be driven for turning in the case of boring or tapping. In order to prepare for such operations above, the so-called "live tool" function is often realized by integrating a tool driving shaft into the turret, thus allowing the tool to be used as a power tool.

With the turret head device with conventional live tool function, one side of its double shaft is connected with the turret and the other side is connected with the tool driving shaft, and it usually has a turret-driving motor and a tool-driving motor separately. Another type of turret head device that enables the common motor to be connected with either one of the two gear trains is also known, in which the two gear trains correspond to the turret and the tool driving shaft, respectively.

In the former case of the related art, it is unavoidable that the whole device size becomes very large due to the necessity of two separate motors for driving the turret and the tool. In the latter case, the overall configuration becomes complicated because two gear trains are used. Furthermore, as the case may be, a hydraulic circuit for change-over may have to be provided at a specified position in the turret to change gear trains, which may possibly result in local deformation due to heat inside the turret and reduce machining precision.

SUMMARY OF THE INVENTION

It is an object of the present invention to provide an improved turret head device for machine tool capable of easily realizing high machining precision due to more compact size as well as the simplified overall configuration by adopting two sets of planetary gear mechanisms after fully taking into account the problems mentioned above for the conventional art.

In order to achieve the object above, the turret head device according to the present invention comprises a housing, a motor mounted on the rear surface of the housing, the first and second planetary gear mechanisms both integrated into the housing, a turret for mounting tools connected with the motor through the first and second planetary gear mechanisms, and a tool driving shaft integrated into the turret and connected with the motor through the first planetary gear mechanism.

With the aforementioned configuration of the present invention, both the turret and the tool driving shaft can be driven for turning by a common motor through the first and second planetary gear mechanisms and the first planetary gear mechanism, respectively. In such an instance, each power transmission system for the turret or tool driving shaft can be easily changed without applying hydraulic pressure into the turret because the planetary gear mechanism having two degrees of freedom can use one end of either the sun gear or the carrier on which planetary gear is mounted, or the ring gear as input end, and the other end thereof as output end by constraining any one of the three components above.

The housing is shaped cylindrical, and the motor, the first and second planetary gear mechanisms, and the turret can be aligned with the same axis.

When the housing is shaped cylindrical and the motor, the first and second planetary gear mechanisms and the turret are aligned with the same axis, the overall configuration of the device can be made axisymmetric, each member can be simply turned with good precision, and local deformation due to heat can be minimized.

The carrier and ring gear of the first planetary gear mechanism can be set to correspond to the sun gear and carrier of the second planetary gear mechanism, respectively, the turret can be connected with the carrier of the second planetary gear mechanism, and the tool driving shaft can be connected with the carrier of the first planetary gear mechanism. The ring gear of the second planetary gear mechanism can be constrained or released by a clutch, while the turret may be constrained or released by interlocking it with the clutch.

When the carrier and ring gear of the first planetary gear mechanism are set to correspond to the sun gear and carrier of the second planetary gear mechanism, the first and second planetary gear mechanisms can be structured coaxial and extremely compact by integrally forming respective corresponding members.

When the turret is connected with the carrier of the second planetary gear mechanism and the tool driving shaft is connected with the carrier of the first planetary gear mechanism, the tool driving shaft can be connected with the carrier of the first planetary gear mechanism, for example, through an auxiliary shaft being positioned at the axial center of the turret and coaxial with the carrier of the second planetary gear mechanism. However, in such an instance, the auxiliary shaft may be integrally formed with the carrier of the first planetary gear mechanism or formed as a separate member to be connected therewith.

When the ring gear of the second planetary gear mechanism is constrained or released by a clutch, the clutch can release or constrain the turret at the same time. In other words, the clutch allows the turret to be driven to choose the tool for use by releasing the turret and constraining the ring gear, while it allows the tool driving shaft to be driven so that the workpiece can be machined by constraining the turret and releasing the ring gear, because the turret connected with the carrier of the second planetary gear mechanism can be freely and turnably driven by constraining the ring gear with the clutch, while the tool driving shaft connected with the carrier of the first planetary gear mechanism, which corresponds to the sun gear of the second planetary gear mechanism, can be freely and turnably driven by constraining the turret and idling the ring gear with the carrier of the first planetary gear mechanism.

The carrier of the first planetary gear mechanism may be set to correspond to the sun gear of the second planetary gear mechanism, and the ring gear of the first planetary gear mechanism may be formed in the housing.

If the carrier of the first planetary gear mechanism is set to correspond to the sun gear of the second planetary gear mechanism and the ring gear of the first planetary gear mechanism is formed in the housing, it becomes unnecessary to separately incorporate the ring gear of the first planetary gear mechanism and the pertaining members such as bearings into the housing. As a result, the housing diameter can be reduced at the portion in which the first planetary gear mechanism is housed.

The ring gear of the second planetary gear mechanism may be constrained or released by a lock pin.

When the ring gear of the second planetary gear mechanism is constrained or released by a lock pin, the lock pin can stably constrain or release the ring gear for a long time. Moreover, its use contributes to simplifying the overall structure. In this instance, it is enough for the turret to be released or constrained independently.

The first planetary gear mechanism can be connected with the tool driving shaft through an auxiliary shaft arranged in parallel with the central turning axis of the turret, the carrier of the first planetary gear mechanism can be set to correspond to the sun gear of the second planetary gear mechanism, and the ring gear of the second planetary gear mechanism can be formed in the housing. The ring gear of the first planetary gear mechanism may be constrained or released by a lock pin.

If the first planetary gear mechanism is connected with the tool driving shaft through an auxiliary shaft being parallel with the central turning axis of the turret, the auxiliary shaft can be optionally connected with any one of several tool driving shafts eccentrically arranged in parallel with the central turning axis of the turret, thus minimizing the mechanical loss by turnably driving only one tool driving shaft. In this instance, it is enough for the turret to be formed in a simple disk shape where the tool driving shaft is arranged on the peripheral circumference.

If the carrier of the first planetary gear mechanism is set to correspond to the sun gear of the second planetary gear mechanism and the ring gear of the second planetary gear mechanism is formed in the housing, it becomes unnecessary to incorporate the large-diameter ring gear of the second planetary gear mechanism into the housing. As a result, the total number of members can be reduced, the overall housing diameter can be reduced, and the device becomes lightweight.

If the ring gear of the first planetary gear mechanism is constrained or released by a lock pin, the lock pin can stably control the ring gear for a long time. In this instance also, it is enough for the turret to be released or constrained independently.

The first planetary gear mechanism may be connected with the motor through a speed change gear mechanism.

When the first planetary gear mechanism is connected with the motor through a speed change gear mechanism, the speed change gear mechanism can shift motor speed and transfer the number of its revolutions to the first planetary gear mechanism. As a result, the number of revolutions of the power tool connected with the tool driving shaft can be changed.

The tool driving shaft can be driven for turning in the low-speed or high-speed turning mode by optionally connecting the motor with the sun gear and the carrier or ring gear of the first planetary gear mechanism, through a speed change gear mechanism. This is made possible because the speed reduction function of the first planetary gear mechanism works effectively in the low-speed mode, while this function does not work in the high-speed mode.

The speed change gear mechanism optionally allows the motor to be connected with the ring gear of the first planetary gear mechanism and either the sun gear or carrier. Thus, it allows the motor to be optionally connected with the first planetary gear mechanism at the same phase, regardless of the tool position of the turret.

If the motor is optionally connected with the first planetary gear mechanism at the same phase through a speed change gear mechanism, the complicated procedure for phase matching becomes unnecessary in operating the speed change gear mechanism. Furthermore, speed change of the tool driving shaft can be smoothly carried out, regardless of the tool position of the turret.

As described above, the turret head device of present invention brings about excellent effects by the combined use of the turret, first and second planetary gear mechanisms, and tool driving shaft: i.e., common use of a motor for driving the turret and the tool, coaxial and cylindrical alignment of all the major components including the motor, and compact device size and simplified overall configuration without introducing hydraulic circuit into the turret. These features will realize excellent precision of machining.

The device can flexibly meet diverse needs in the applications for which no power tool is required by eliminating the tool driving shaft.

These and other objects, features and advantages of the invention will become more apparent upon reading the detailed description of the preferred embodiment with reference to the appended drawings.

BRIEF DESCRIPTION OF THE DRAWINGS

FIG. 21 is a table showing a functional combinations;

DETAILED DESCRIPTION OF THE PREFERRED EMBODIMENT OF THE INVENTION

Figure 1:
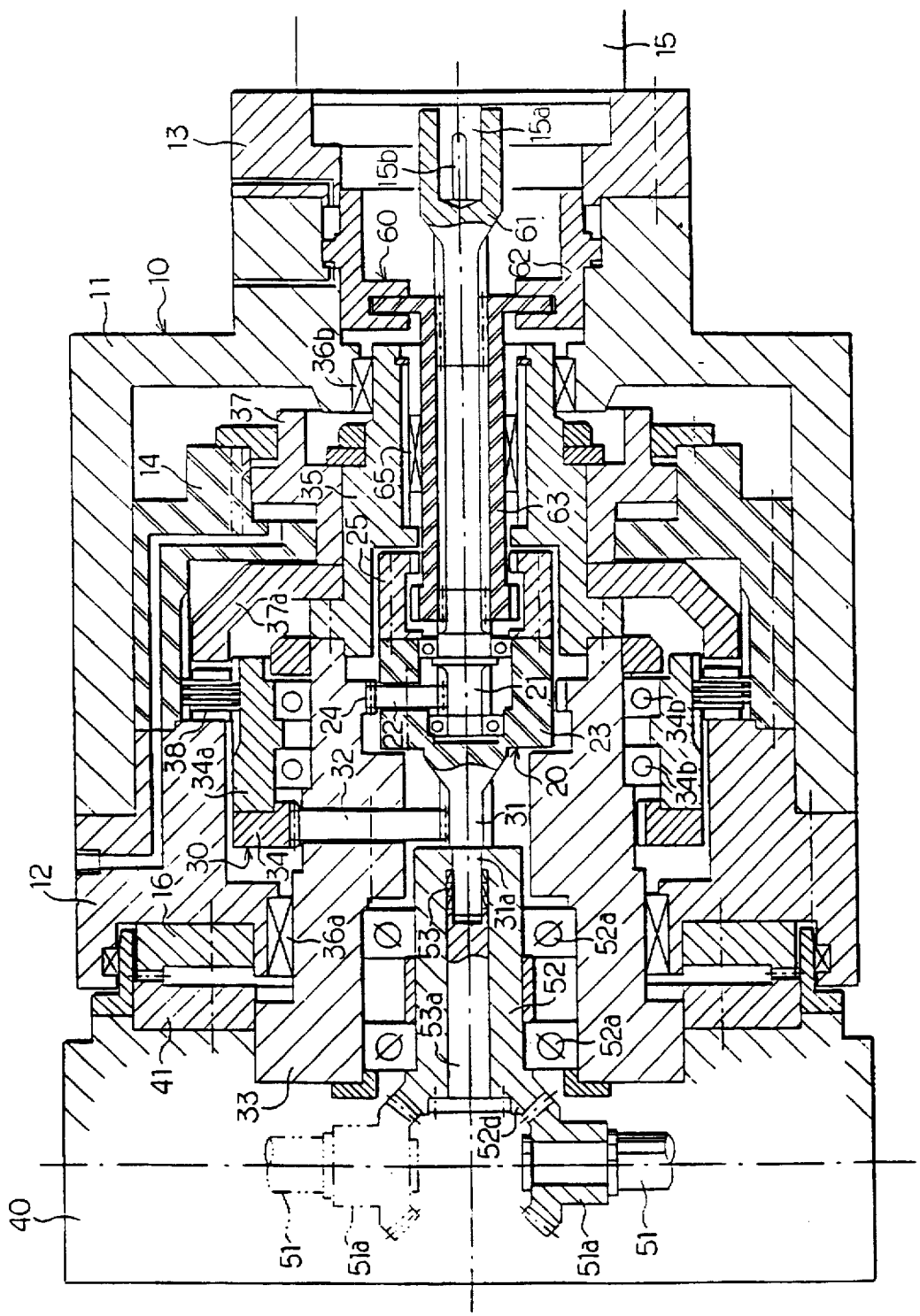
FIG. 1 is an overall schematic cross-sectional view of a turret device for machine tool of this invention.
Figure 2:
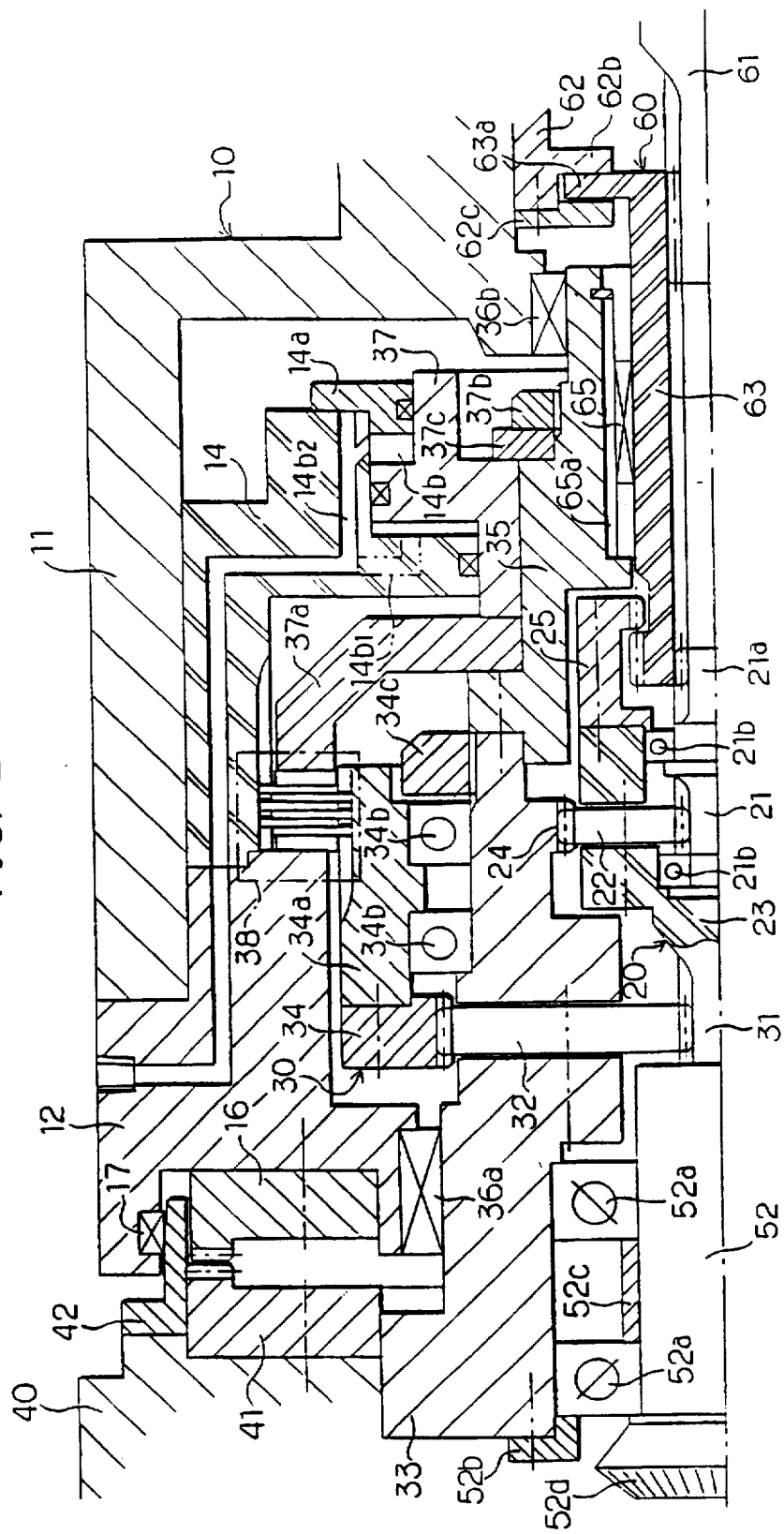
FIG. 2 is a partially-enlarged cross-sectional view showing a main part of FIG. 1.

The turret head device for machine tool of this invention mainly comprises a cylindrical housing 10, a motor 15 mounted at the rear of the housing 10, the first and second planetary gear mechanisms 20, 30 both integrated into the housing 10, a turret 40, and a tool driving shaft 51 integrated into the turret 40 (FIGS. 1 and 2). The first and second planetary gear mechanisms 20, 30, the motor 15, and the turret 40 are aligned with the central axis of the housing 10.

The housing 10 consists of a body member 11 of which front portion is formed to have a larger diameter and rear portion to have a smaller diameter, a front member 12 to be fitted with front end of the body member 11, and a rear member 13 to be fitted with rear end of the body member 11. An auxiliary member 14 is housed in the body member 11 by being added to the rear surface of the front member 12. The motor 15 is attached to the rear surface of rear member 13.

The first and second planetary gear mechanisms 20, 30 are respectively composed of centrally-positioned sun gears 21, 31, carriers 23, 33 on which planetary gears 22, 32 are mounted, and ring gears 24, 34 with internal teeth with which planetary gears 22, 32 are engaged. Provided that a plurality of planetary gears 22, 32 shall be concylically mounted on the carriers 23, 33 besides gears shown in FIGS. 1 and 2. The ring gear 24 of the first planetary gear mechanism 20 is formed on the internal rear portion of the carrier 33 of the second planetary gear mechanism 30, and the sun gear 31 of the second planetary gear mechanism 30 is protrusively formed in front of the carrier 23 of the first planetary gear mechanism 20.

The sun gear 21 of the first planetary gear mechanism 20 is turnably housed in the carrier 23 with bearings 21b, 21b lying between. A spline 21a is additionally formed on the rear portion of the sun gear 21, and a cylindrical boss member 25 is attached to the rear surface of the carrier 23.

A support member 35 is connected with the rear end of the carrier 33 of the second planetary gear mechanism 30. The carrier 33 and support member 35 are housed in the front member 12 and the body member 11 of the housing 10 through metal bushes 36a, 36b in a turnable and back-and-forth move-free manner. Another support member 34a is connected with the rear surface of the ring gear 34, and the ring gear 34 is turnably attached to the external rear portion of the carrier 33 through the support member 34a and bearings 34b, 34b. The bearings 34b, 34b are fixed by the nut 34c.

A driving member 37 is arranged on the external periphery of support member 35 that is connected with the carrier 33. The driving member 37, together with a large-diameter pressurizing member 37a having an opening toward the front portion of support member 35, is combined with the support member 35 through a nut 37b and a collar 37c in a relatively turnable manner. A ring member 14a is additionally mounted on the rear end of the auxiliary member 14 of the housing 10, and the part of maximum diameter at the intermediate position of the driving member 37 is inserted into a hydraulic chamber 14b that is formed between the auxiliary member 14 and the ring member 14a to partition the hydraulic chamber 14b into the two (front and rear) portions. The external periphery of the driving member 37 is slidably in contact with the auxiliary member 14 at two points and also slidably in contact with the ring member 14a at one point through the necessary seal packing. The hydraulic chamber 14b is connected with an external hydraulic source of the housing 10 through the front and rear oil paths 14b1, 14b2 which are independently set each other.

The front edge of the pressurizing member 37a faces the rear surface of the front member 12 of the housing 10 each other, with a clutch 38 put between. The clutch 38 being a multiple disc clutch has a combined structure of a plurality of clutch plates which turn integrally with the support member 34a additionally attached to the ring gear 34, and a plurality of clutch plates which remain motionless integrally with the auxiliary member 14 of the housing 10. The former clutch plates have internal teeth to coincide with the spline on external periphery at the rear portion of the support member 34a, while the latter clutch plates have external teeth to coincide with the spline on internal periphery at the front portion of the auxiliary member 14. Both of these clutch plates are alternately arranged with appropriate shoes lying between.

Accordingly, the support member 35 and the carrier 33 can be moved forward/backward by actuating the driving member 37 back and forth as a result of application of hydraulic pressure into either front or rear portion of the hydraulic chamber 14b through the oil paths 14b1, 14b2. When the carrier 33 is moved forward, the pressurizing member 37a interlocked with the driving member 37 applies some pressure to the clutch 38, which enables the clutch 38 to constrain the turn of the ring gear 34 through the support member 34a. When the carrier 33 is moved back, the constraint of the support member 34a and ring gear 34 can be released.

The turret 40 is connected with the front end of the carrier 33. The mutually-engaged gear members 41, 16 are attached to the front surface of the front member 12 of the housing 10. The gear members 41, 16 can release the turret 40 to a freely turnable state by disengaging themselves from each other when the turret 40 is moved forward through the carrier 33, and constrain it at the specified tool position by engaging themselves to each other when the turret 40 is moved back through the carrier 33. That is to say, the turret 40 can be connected with the clutch 38 that constrains or releases the ring gear 34 of the second planetary gear mechanism 30, because the ring gear 34 is constrained by the clutch 38 when the carrier 33 and the turret 40 move forward to release the turret 40, while the ring gear 34 is released by the clutch 38 when the turret 40 is constrained. The turret 40 may be formed polygonal such as octagon and dodecagon so that the circumferential surfaces can be used to mount a plurality of tools.

A dust seal cover 42 is additionally mounted on the external periphery of the gear member 41, and a dust seal 17 with which the external surface of dust seal cover 42 is slidably in contact is mounted on the internal surface of the front end of the front member 12. The external surface of the dust seal cover 42 is loosely tapered to make the tip have a smaller diameter, which serves to avoid causing a great sliding resistance between the turret 40 and the dust seal 17 when the turret 40 moves forward and turns.

An auxiliary shaft 52 is turnably housed in the front portion of the carrier 33 through angular contact type bearings 52a, 52a. The bearings 52a, 52a are positioned through a bearing cap 52b and a spacer 52c. The auxiliary shaft 52 is connected with the sun gear 31 of the second planetary gear mechanism 30, that is, the carrier 23 of the first planetary gear mechanism 20, and a bevel gear 52d is formed at the tip protruding into front end of the carrier 33.

A friction type connector 53 is assembled into the connection with the sun gear 31 and auxiliary shaft 52. The connector 53 can transfer the preset rotary torque from the sun gear 31 to the auxiliary shaft 52 by internally mounting, for example, alternately-combined flexible rings with right-angled triangular section or those with right-angled trapezoidal section into the gap formed between the external surface of a connecting shaft 31a, which is protrusively mounted on the front surface of the sun gear 31, and the internal surface of the auxiliary shaft 52, and then by pressurizing axially through the push rod 53a.

The tool driving shaft 51 is turnably housed in the turret 40 through bearings (not shown). Appropriate power tools can be attached to the tip of tool driving shaft 51 (not shown) around the peripheral surface of the turret 40 in a protrusive manner. The bevel gear 51a is additionally installed at the bottom of the tool driving shaft 51, and the bevel gear 51a is engaged with the bevel gear 52d of the auxiliary shaft 52. That is to say, the tool driving shaft 51 is connected with the carrier 23 of the first planetary gear mechanism 20 through the bevel gears 51a, 52d, auxiliary shaft 52, and sun gear 31. One or a plurality of tool driving shafts 51, 51 . . . can be radially housed in the turret 40. Each of the driving shaft 51 can be rotated with common bevel gear 52d of the auxiliary shaft 52 (indicated by a two-dot long and two short dashes line in FIG. 1).

A connecting member 61 is fixed to the shaft 15a of the motor 15 through a key 15b (FIGS. 1 and 3), and the spline 61a is formed at the tip of the connecting member 61.

The speed change gear mechanism 60 consists of the connecting member 61, the sliding member 62 commonly slidable against both the body member 11 and rear member 13 of housing 10, the cylindrical spline rod 63, the spline 21a additionally formed on the sun gear 21 of the first planetary gear mechanism 20, and the boss member 25 additionally mounted on the carrier 23.

Figure 4:
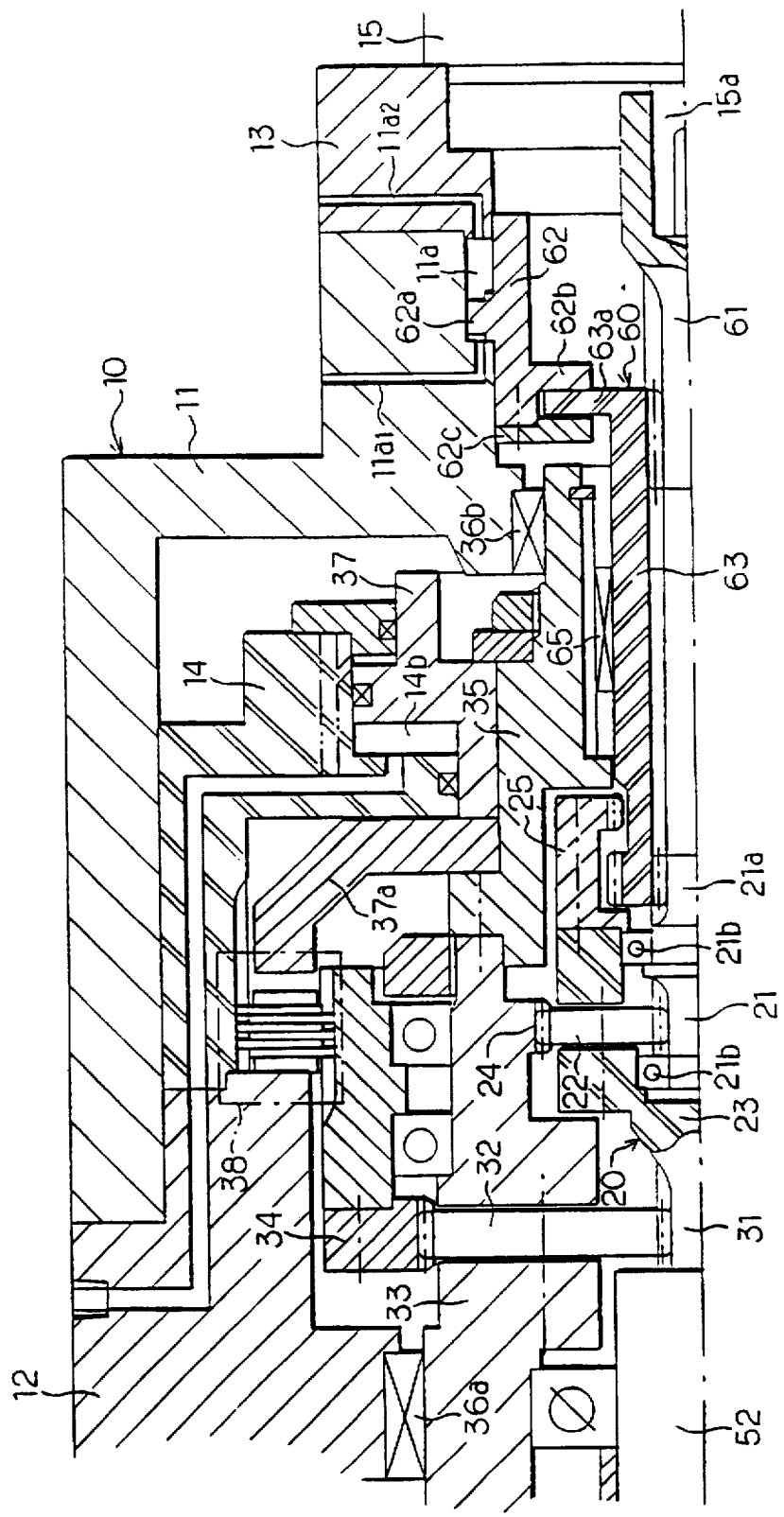
FIG. 4 is a partially-enlarged cross-sectional view of FIG. 1 showing a spline rod at an advanced position.

A circular projection 62a is formed at the intermediate position of external periphery of the sliding member 62 (FIGS. 1 and 4). The circular projection 62a is inserted into the air chamber 11a that is formed on internal surface of the body member 11 of housing 10 and it partitions the air chamber 11a into the front and rear portions. The air chamber 11a is connected with an external air source through the front and rear air paths 11a1, 11a2 both set in the body member 11 and the rear member 13, respectively. An internal flange 62b is formed on the internal front portion of the sliding member 62, and a ring member 62c corresponding to the internal flange 62b is additionally mounted on the front end of the sliding member 62.

Figure 3:
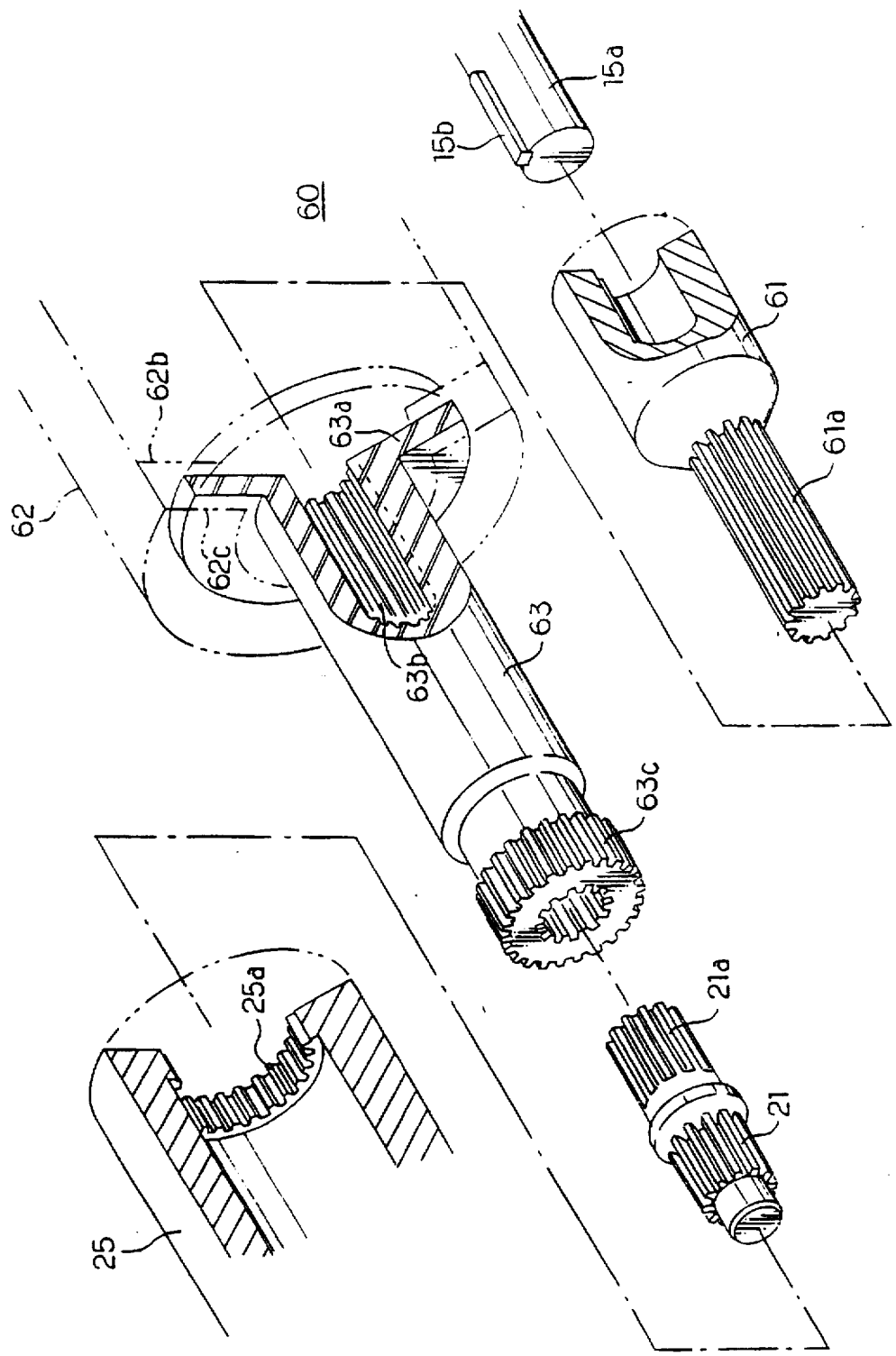
FIG. 3 is a partially-disassembled perspective view showing a speed gear mechanism.

The internal flange 62b of the sliding member 62 and the external flange 63a thereof which engages with the ring member 62c are formed at the rear end of the spline rod 63 (FIGS. 2 and 3). In addition, a spline 63b is formed on the internal surface of the spline rod 63 for full length of the rod, and a short spline 63c is also formed on the external surface at the front end of the spline rod 63. The spline rod 63 is integrated into the support member 35 in a relatively turnable and back-and-forth freely movable manner through the linear guide 65, and the linear guide 65 is integrated into the rear portion of the support member 35 through the guide cylinder 65a.

A spline 25a is formed on the internal rear portion of the boss member 25. The spline 61a of the connecting member 61, together with the spline 21a additionally set on the sun gear 21 of the first planetary gear mechanism 20, engages with the spline 63b on the internal surface of the spline rod 63. The spline 25a of the boss member 25 engages with the spline 63c at the front end of the spline rod 63.

Figure 5:
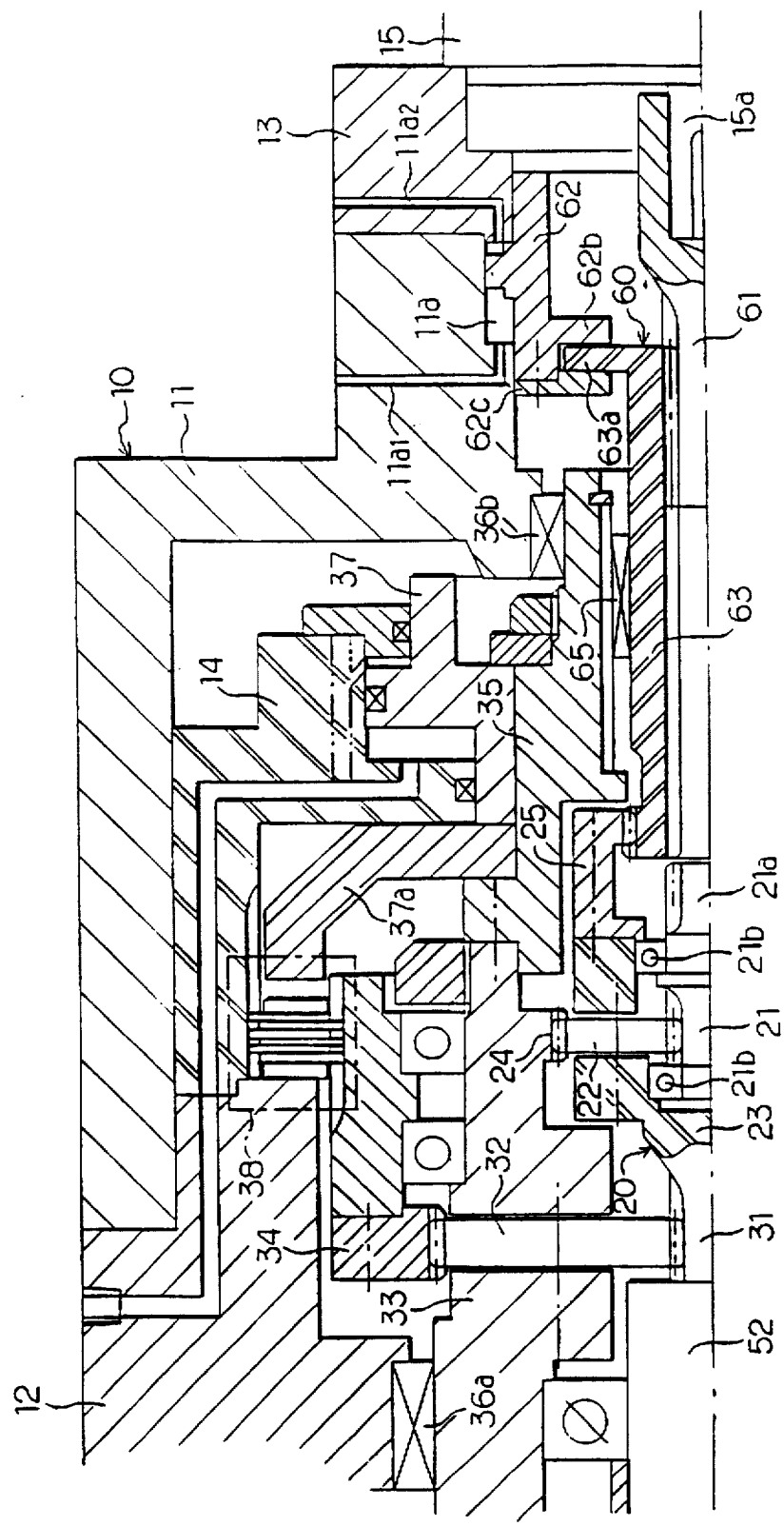
FIG. 5 is a partially-enlarged cross-sectional view of FIG. 1 showing a state in which the engagement of the spline rod with a boss member.

The spline rod 63 can be moved forward/backward by applying air pressure to either front or rear portion of the air chamber 11a through the air paths 11a1, 11a2 and then driving the sliding member 62 back and forth. When the spline rods 63 moves forward, the sun gear 21 can be connected with the motor 15 by the engagement of the spline 63b at internal surface with the spline 21a of the sun gear 21 (FIG. 4), and when spline rod 63 moves backward, the carrier 23 of the first planetary gear mechanism 20 can be connected with the motor 15 through the boss member 25 by the engagement of the spline 63c at the front end with the spline 25a of the boss member 25 (FIG. 5). Provided that the shaft 15a of the motor 15 shall be connected with the spline rod 63 through the spline 61a of the connecting member 61 and the spline 63b of the spline rod 63 regardless of the back-and-forth movement of the spline rod 63.

Here, the first planetary gear mechanism 20 can be connected with the motor 15 through the speed change gear mechanism 60 including the spline rod 63. In this instance, the speed change gear mechanism 60 enables the motor 15 to be optionally connected with the sun gear 21 or the carrier 23.

The turret head device of this invention described above operates in the following manner.

Figure 6:
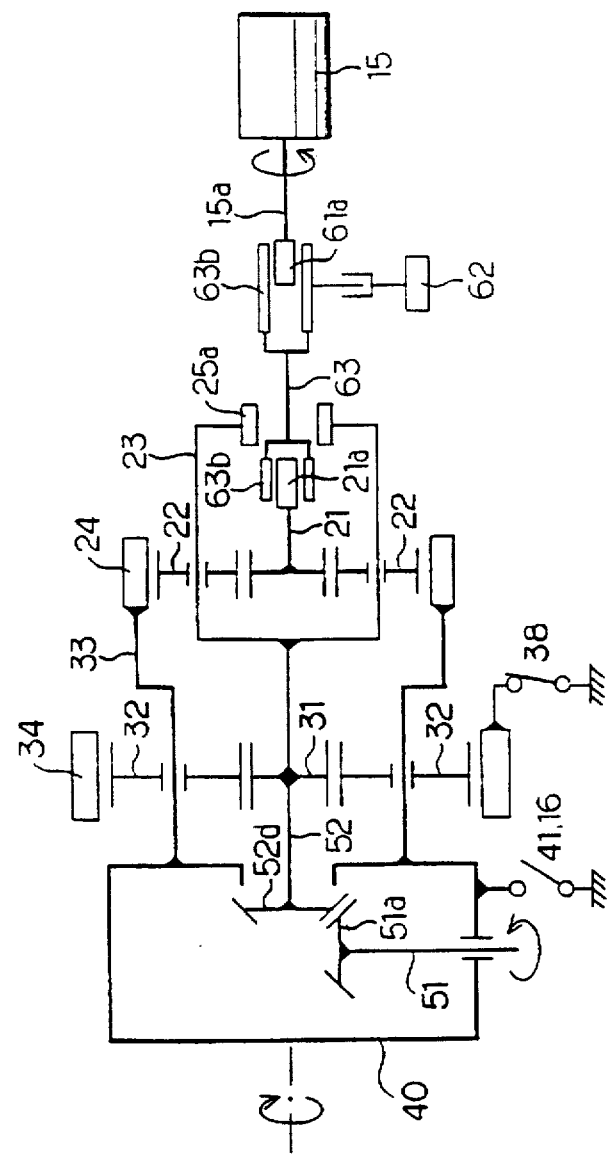
FIG. 6 is a diagram showing a gear train in a turret turning mode.

When the carrier 33 of the second planetary gear mechanism 30 and the turret 40 are moved forward through the driving member 37 and support member 35 (FIG. 2) by applying hydraulic pressure into the rear portion of the hydraulic chamber 14b, the engagement between the gear members 41, 16 at the turret 40 side and the housing 10 side is unlocked to release the constraint of the turret 40. At this moment, the clutch 38 can constrain the ring gear 34 through the support member 34a as the pressurizing member 37a moves forward. At this moment, the speed change gear mechanism 60 shall keep the motor 15 connected with the sun gear 21 of the first planetary gear mechanism 20 (FIG. 6) through the sliding member 62 by applying air pressure into the rear portion of the air chamber 11a to move the spline rod 63 forward.

At this operation, the whole device is set into the turret-turning mode, and the turret 40 can be driven for turning through the spline rod 63, sun gear 21 of the first planetary gear mechanism 20, planetary gear 22, ring gear 24 and carrier 33 of the second planetary gear mechanism 30, and thereby an optional tool position can be selected. In this instance, although the tool driving shaft 51 in the turret 40 is also driven for turning through the planetary gear 32, sun gear 31, auxiliary shaft 52, and bevel gears 52d, 51a since the carrier 33 turns due to the constraint of ring gear 34, the tool driving shaft 51 only idles itself.

In the turret-turning mode, the retardation ratio R4a, R5a of the turret 40 and tool driving shaft 51 against the number of revolutions n1 of the motor 15 for the number of revolutions n4, n5 can be expressed by the following equations, respectively:

$$R4a = n4/n1 = Z4Z1/((Z4+Z6)Z1+Z3Z6)$$
$$R5a = n5/n1 = (Z7/Z8)(Z4+Z6)Z1/((Z4+Z6)Z1+Z3Z6)$$

where;

Z1: Number of teeth of the sun gear 21
Z2: Number of teeth of the planetary gear 22
Z3: Number of teeth of the ring gear 24
Z4: Number of teeth of the sun gear 31
Z5: Number of teeth of the planetary gear 32
Z6: Number of teeth of the ring gear 34
Z7: Number of teeth of the bevel gear 52d
Z8: Number of teeth of the bevel gear 51a.

Then, it becomes possible to enable the turret 40 to detect the number of revolutions of the motor 15 with an encoder (not shown), turn only by an optional turning angle by applying the retardation ratio R4a, and select the specified tool position. In this manner, choosing a tool position of the turret 40 enables the turret 40 to be constrained by applying hydraulic pressure into the front portion of the hydraulic chamber 14b and then making the gear members 41, 16 engage to each other. As a result, a specified machining of the workpiece (not shown) can be carried out using a stationary tool that corresponds to the tool position selected as above.

Figure 7:
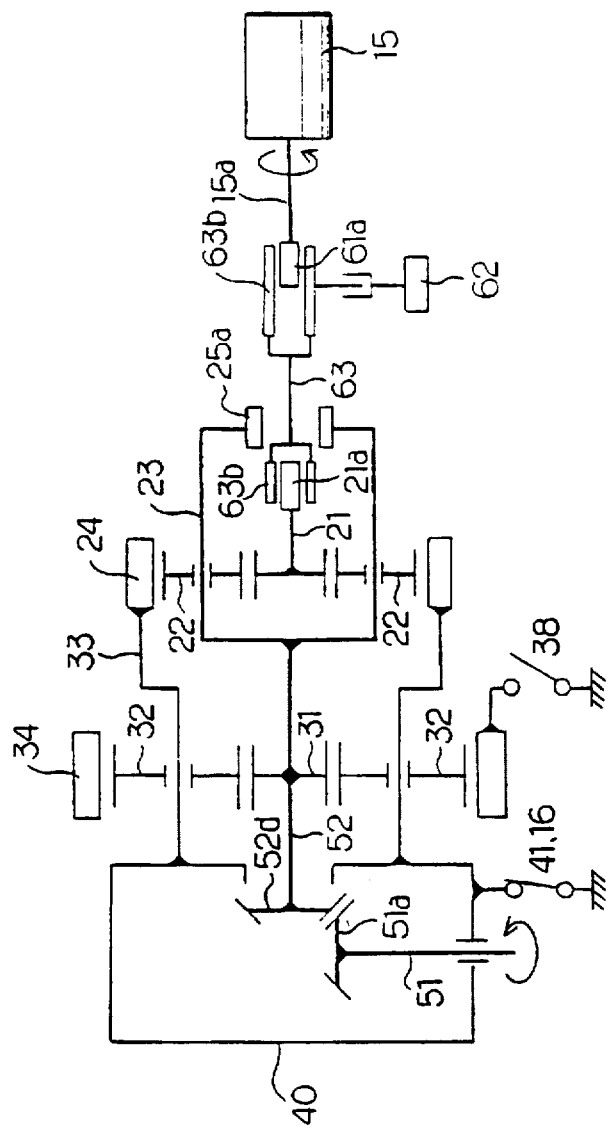
FIG. 7 is a diagram showing a gear train in a low speed tool driving mode.

Next, when a power tool is mounted on the tool position, the operation mode of the whole device can be shifted to the low-speed tool driving mode by activating the motor 15 (FIGS. 4 & 7).

At this moment, the turn of motor 15 can be transferred to the tool driving shaft 51 through the spline rod 63, sun gear 21, planetary gear 22, carrier 23, sun gear 31, auxiliary shaft 52, and bevel gears 52d, 51a. In this case, the ring gear 24 and the carrier 33 remain motionless due to the constrained turret 40, and the ring gear 34 is idling because it is released from the constraint by the clutch 38 and the planetary gear 32 is turning.

Here, the retardation ratio R4b, R5b of the turret 40 and the tool driving shaft 51 against the number of revolutions n1 of the motor 15 for the number of revolutions n4, n5 can be expressed by the following equations, respectively:

$$R4b = n4/n1 = 0$$
$$R5b = n5/n1 = (Z7/Z8)Z1/(Z1+Z3)$$

Machining the workpiece is available with the power tool mounted on the tool driving shaft 51 because the tool driving shaft 51 can be driven for turning at low-speeds by the motor 15.

Figure 8:
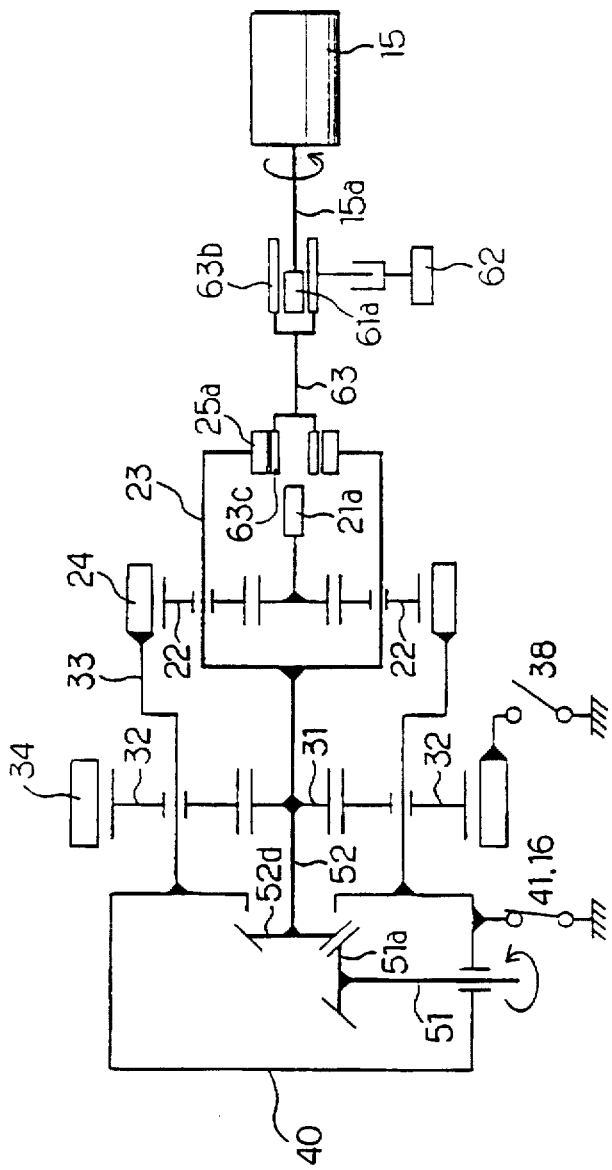
FIG. 8 is a diagram showing a gear train in a high speed tool driving mode.

Next, the whole device can be shifted to the high-speed tool driving mode by applying air pressure into the front side of the air chamber 11a to move back the spline rod 63 and then connecting the motor 15 with the carrier 23 of the first planetary gear mechanism 20 (FIGS. 5, 8). At this moment, the turn of the motor 15 can be transferred to the tool driving shaft 51 through the spline rod 63, carrier 23, sun gear 31, auxiliary shaft 52, and bevel gears 52d, 51a. High-speed machining of the workpiece becomes available with the power tool mounted on the tool driving shaft 51. In this instance, the retardation ratio R4c, R5c of the turret 40 and the tool driving shaft 51 can be expressed as follows, respectively:

$$R4c = n4/n1 = 0$$
$$R5c = n5/n1 = Z7/Z8$$

In the turret-turning mode, the retardation ratio R4a, R5a of the turret 40 and the carrier 23 against the motor can be expressed as follows, respectively:

$$R4a = 1/(1+P+PQ)$$
$$R3a = (Z8/Z7)R5a = (1+P)/(1+P+PQ)$$

where;

$$P = Z6/Z4$$
$$Q = Z3/Z1$$

Suppose that the turning angle were to be turned by the sun gear 21 (corresponding to the motor 15) is θ1 and the turning angle of the carrier 23 is θ3 when the turret 40 having the "N" tool positions is turned by a turning angle for positioning at m (m=1, 2, ... N), the following equations can be formed:

$$θ1 = 2π(m/N)(1/R4a) = 2π(m/N)(1+P+PQ)$$
$$θ3 = θ1R3a = 2π(m/N)(1+P)$$

On the other hand, supposing that the number of teeth of the spline 63b of the spline rod 63 corresponding to the sun gear 21 and that of the spline 63c corresponding to the carrier 23 are R and S, respectively, the following equation $$Rθ1-Sθ3=2πi$$

should be established for all m (m=1,2 ... N) so that the spline rod 63 can move forward/backward without hindrance at every tool position of the turret 40, and the connection with motor 15 can be smoothly changed from either the sun gear 21 or the carrier 23 to the other. Provided that i=0, 1, 2 ... because the connection of the motor 15 can be switched by changing from either the sun gear 21 or the carrier 23 to the other at the same phase.

That is to say, the spline rod 63 enables the whole device to move forward/backward without hindrance regardless of the tool position of the turret 40 and smoothly change the operation mode to either low-speed drive or high-speed drive by selecting the variables P, Q, R and S which satisfy the following equation:

$$(m/N)((1+P+PQ)R-(1+P)S)=i$$

At this moment, the spline rod 63 can block the turn of both the turret 40 and the tool driving shaft 51 by stopping them at the intermediate position where the spline 63b engages with the spline 21a at the sun gear 21 side and the spline 63c engages with the spline 25a at the carrier 23 side, because the relative turn of both the sun gear 21 and carrier 23 can be prevented and constrained through the spline rod 63.

If the variables P, Q, R and S cannot satisfy the equation above, phase matching between the sun gear 21 or carrier 23 and the spline rod 63 may be controlled by rotating the motor 15 that is activated by the output from the sensors, which are installed to detect respective phase differences among the spline 21a at the sun gear 21 side, spline 25a at the carrier 23 side, spline 63b of the spline rod 63, and spline 63c, prior to moving the spline rod 63 forward/backward.

In the description above, if operation mode of the tool driving shaft 51 is not required to be changed to either high-speed or low-speed, the motor 15 may be connected with either the sun gear 21 or the carrier 23 through a simple spline by bypassing the speed change gear mechanism 60.

The turning angle of the turret 40, which corresponds to the turning angle of motor 15, can be detected in the turret-turning mode, based on the counter's readings and retardation ratio R4a by incorporating an encoder in the motor 15 and setting a counter to count output pulses from the encoder. The turning angle of the tool driving shaft 51 can be detected in the low-speed tool driving mode based on the counter's readings and retardation ratio R5b, while the turning angle of the tool driving shaft 51 can be detected in the high-speed tool driving mode based on the counter's readings and retardation ratio R5c.

That is to say, the turning angle of the turret 40 and of the tool driving shaft 51 can be recognized at any time for every operation mode of the whole device using the encoder and counter, respectively, thus even advanced applications such as rigid tapping, polygon mirror machining and thread cutting are easily made available. The turning angle of the turret 40 and of the tool driving shaft 51 can, therefore, be recognized at all times, and the initial set-up operation when the power is turned on can be simplified by placing a non-volatile memory to store respective operation modes and count readings, regardless of the power supply state (ON or OFF). The encoder and counter may be also used for phase matching control of several members by calculating the differences in pre-determined phase among the sun gear 21, carrier 23, and spline rod 63.

Figure 9:
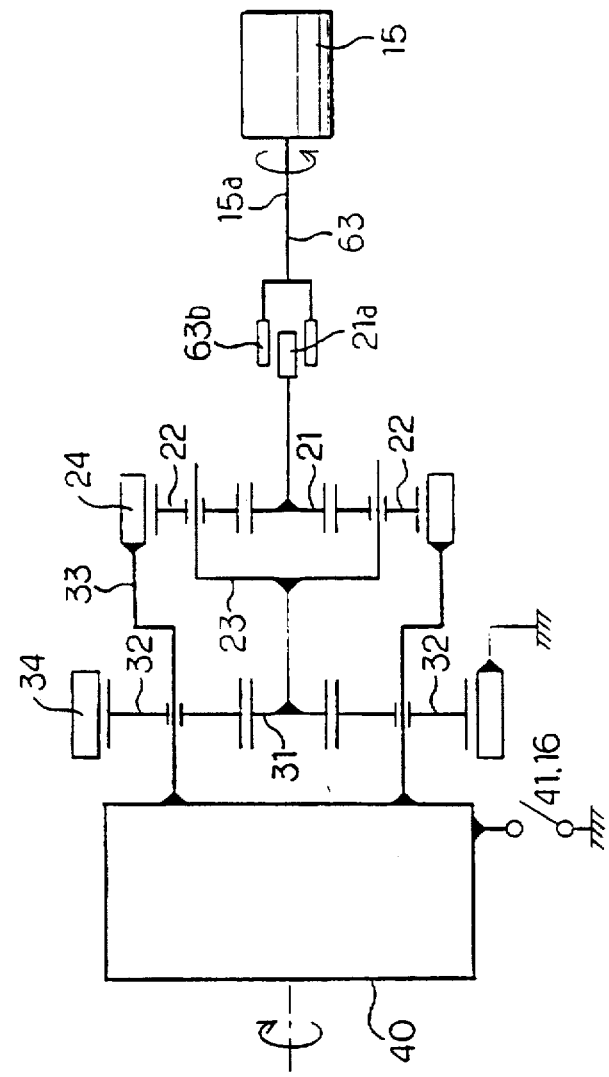
FIG. 9 is a diagram equivalent to FIG. 6 showing an another embodiment.

If the power tool needs not to be mounted on the turret 40, the tool driving shaft 51 can be eliminated (FIG. 9). The overall configuration of the device can be remarkably simplified by eliminating related members including the tool driving shaft 51 and auxiliary shaft 52. In this instance, concerning the second planetary gear mechanism 30, the ring gear 34 is locked and the spline rod 63 is a simple spline connected with the shaft 15a so that the turret 40 and the first and second planetary gear mechanisms 20, 30 can move forward/backward against the motor 15. Even the speed change gear mechanism 60 is eliminated.

[Alternate Embodiment]

Figure 10:
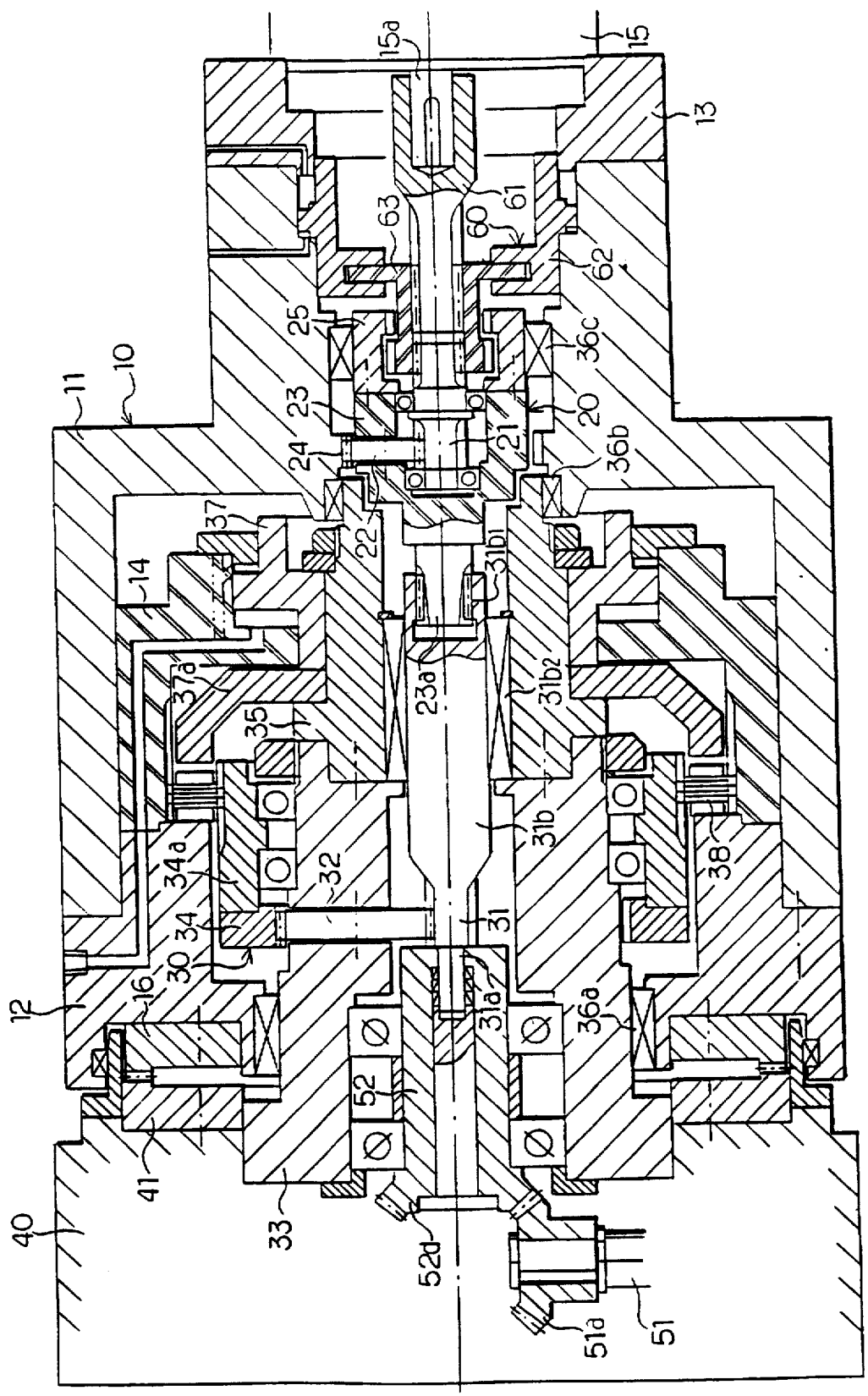
FIG. 10 is an overall schematic cross-sectional view equivalent to FIG. 1 showing an another embodiment of this invention.

In FIG. 1, the ring gear 24 of the first planetary gear mechanism 20 may be formed on rear inside of the body member 11 of the housing 10 (FIG. 10).

The carrier 23 of the first planetary gear mechanism 20 is turnably assembled into the small-diameter portion at the rear of the body member 11 through the boss member 25 and metal bush 36c additionally arranged on the rear surface. A spline 23a is protrusively formed on the carrier 23. The sun gear 31 of the second planetary gear mechanism 30 is formed on the front surface of the long connecting shaft 31b, and a inner-teeth type spline 31b1 fitting with the spline 23a is formed at the rear of the connecting shaft 31b. The connecting shaft 31b is housed in the support member 35 in a freely movable manner, which is linked with the carrier 33 of the second planetary gear mechanism 30 through the metal bush 31b2.

Figure 11:
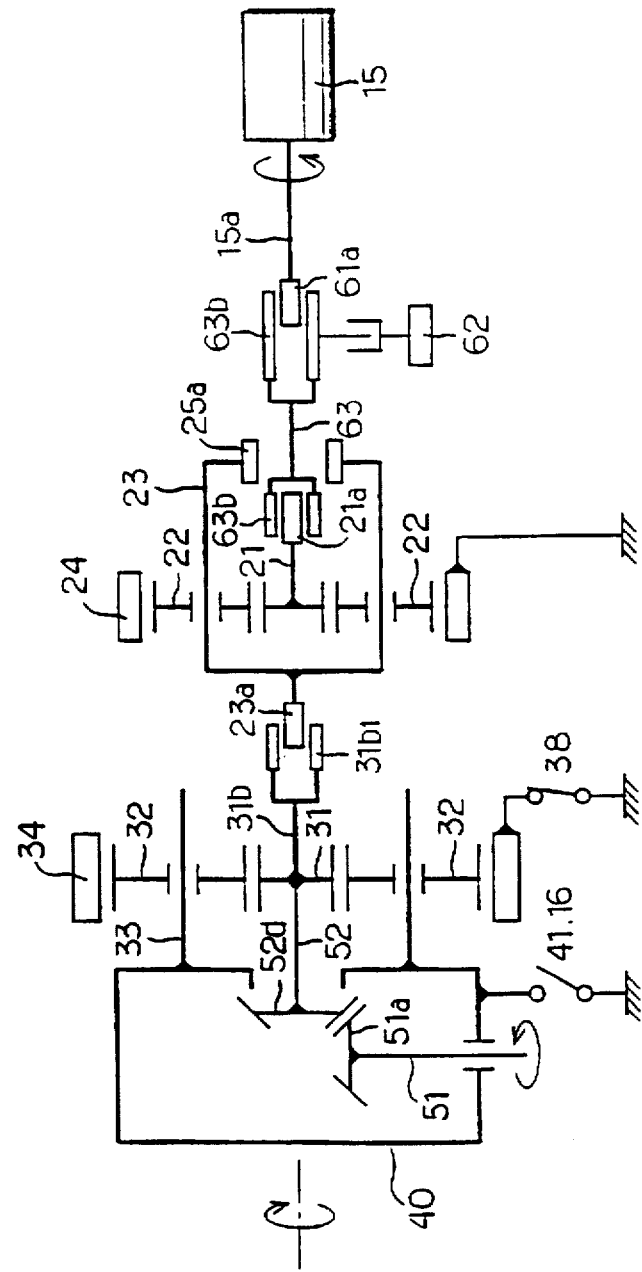
FIG. 11 is a gearing diagram of the another embodiment for operational description equivalent to FIG. 6.

The operation mode of the whole device can be shifted to the turret-turning mode by moving the carrier 33 of the second planetary gear mechanism 30 and the turret 40 forward through the driving member 37 and support member 35 to disengage the gear members 41, 16 and release the constraint of the turret 40, and by constraining the ring gear 34 by the clutch 38 at the same time (FIG. 11). In this instance, the connecting shaft 31b moves forward with the auxiliary shaft 52 but the engagement between the splines 31b1, 23a is never disengaged. Furthermore, the motor 15 can drive the connecting shaft 31b through the sun gear 21, planetary gear 22, and carrier 23 of the first planetary gear mechanism 20, and the connecting shaft 31b can turnably drive the turret 40 through the sun gear 31, planetary gear 32, and carrier 33 of the second planetary gear mechanism 30. As a result, a power transmission channel different from those shown in FIGS. 1 and 6, which enables to drive the turret 40 at a different gear ratio, is realized by forming the ring gear 24 of the first planetary gear mechanism 20 in the housing 10.

Figure 12:
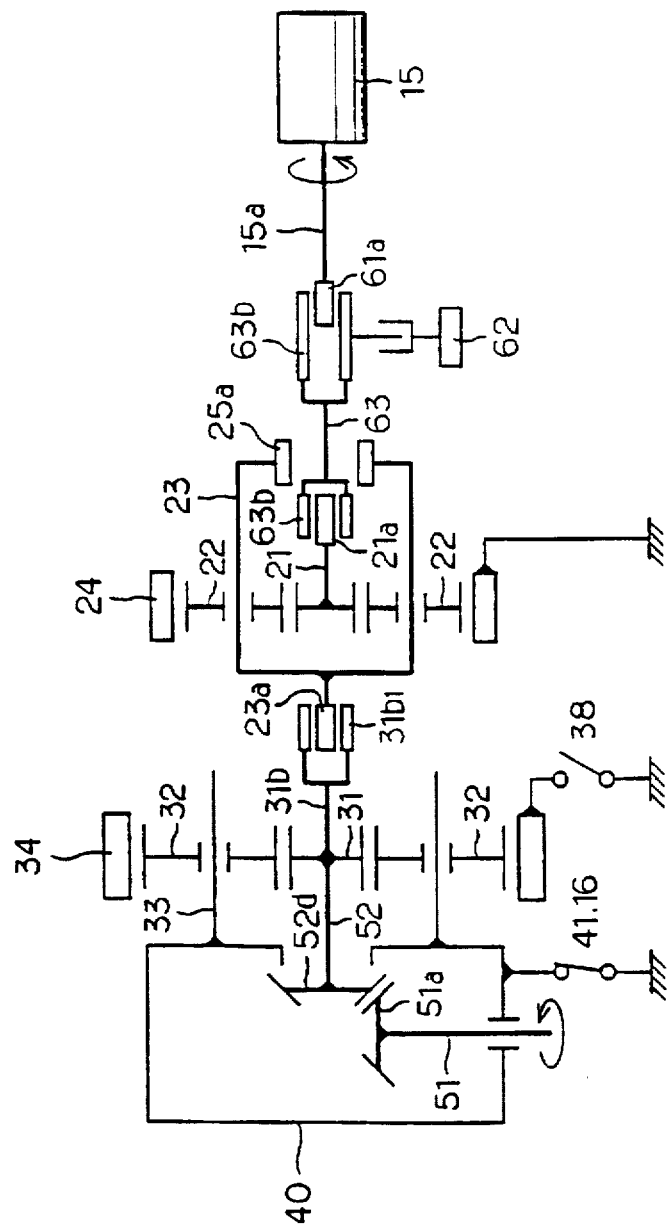
FIG. 12 is a gearing diagram of the another embodiment for operational description equivalent to FIG. 7.

If the tool position of the turret 40 is selected in the turret-turning mode, the operation mode of the whole device can be shifted to the low-speed tool driving mode by moving the driving member 37, support member 35, carrier 33 and turret 40 backward to constrain the turret 40 through the engagement between the gear members 41, 16 and by releasing the ring gear 34 by the clutch 38 (FIG. 12). In this instance, the motor 15 can turnably drive the tool driving shaft 51 through the sun gear 21, planetary gear 22, carrier 23, connecting shaft 31b, sun gear 31, and auxiliary shaft 52. As a result, a power transmission route similar to that shown in FIG. 7 is realized.

Figure 13:
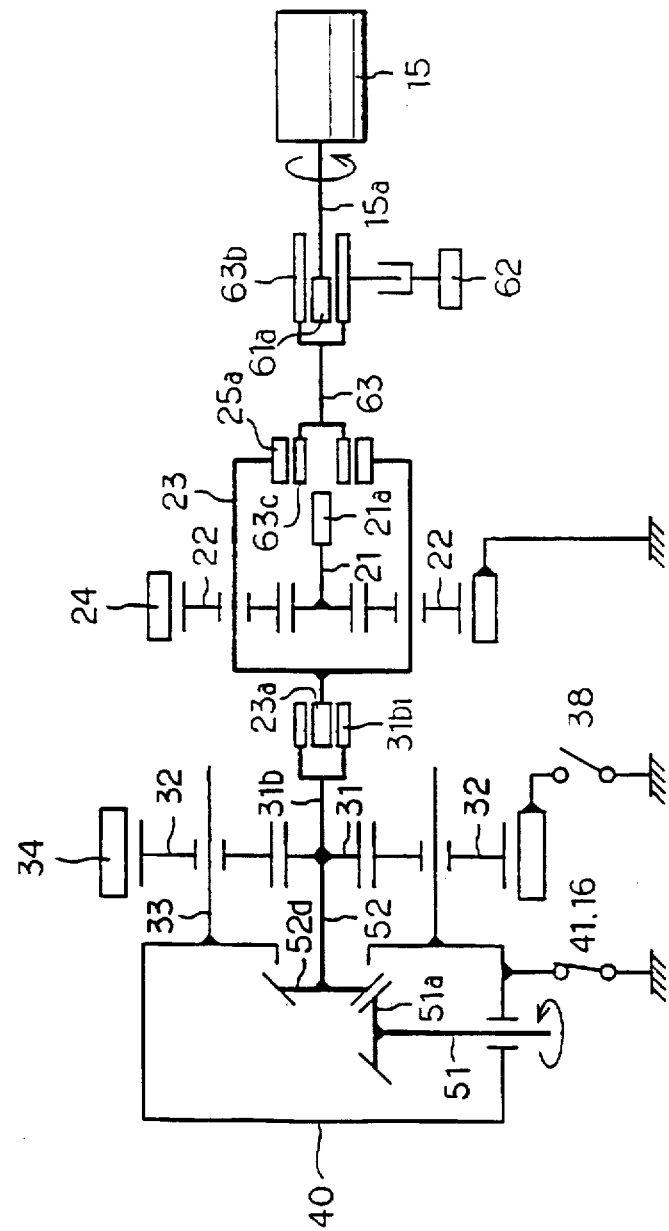
FIG. 13 is a gearing diagram of another embodiment for operational description equivalent to FIG. 8.

Next, the operation mode of the whole device can be shifted to the high-speed tool driving mode by moving the spline rod 63 backward to connect the motor 15 with the carrier 23 (FIG. 13). The power transmission route in this instance is also similar to that shown in FIG. 8.

Figure 14:
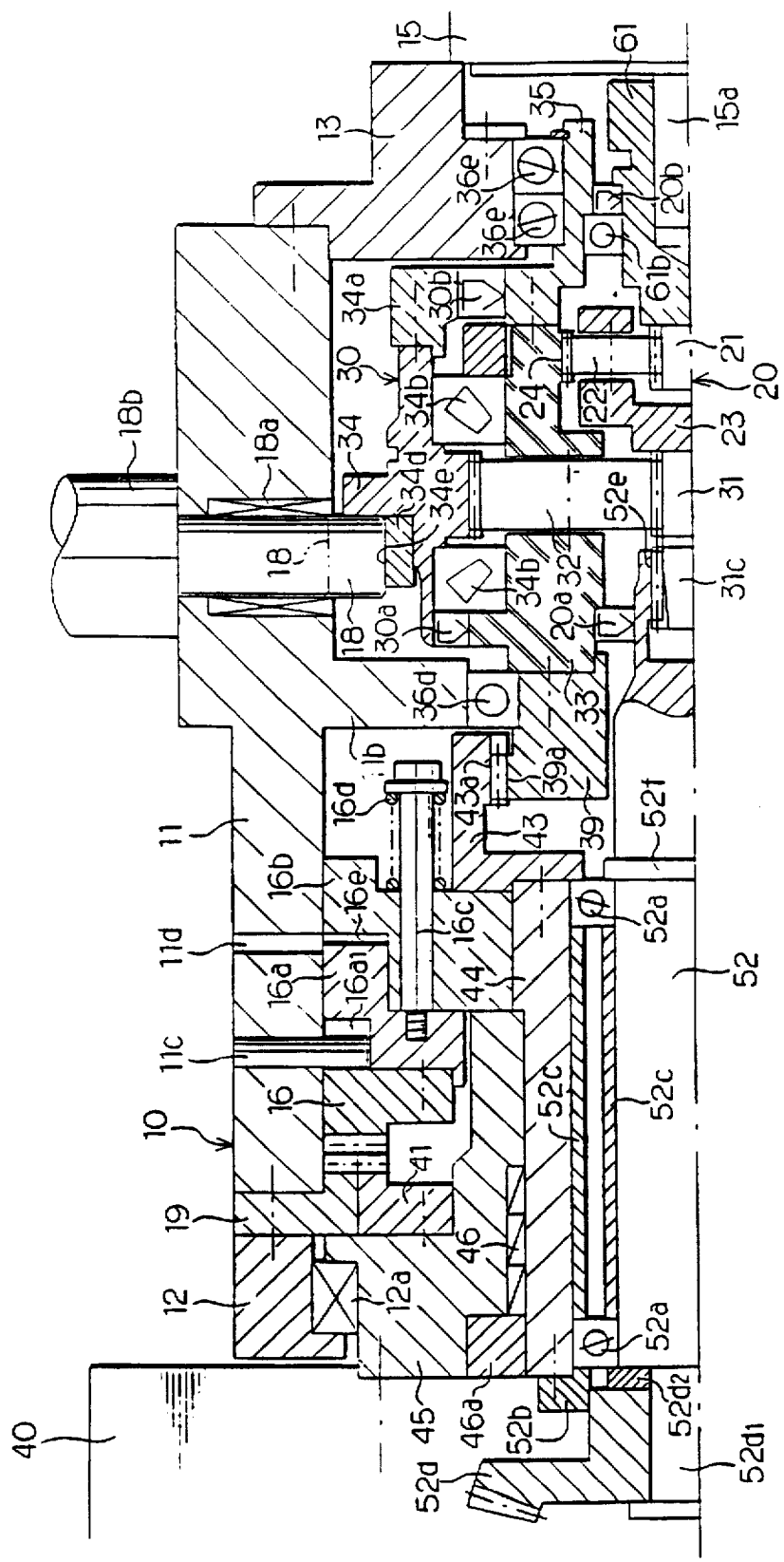
FIG. 14 is a partially-enlarged cross-sectional view of another embodiment using a lock pin for locking and releasing a ring gear of a second planetary gear mechanism.

The ring gear 34 of the second planetary gear mechanism 30 may be constrained or released by the lock pin 18 (FIG. 14). However, the speed change gear mechanism 60 for switching the tool driving shaft 51 to either high-speed or low-speed tool driving mode is eliminated in FIG. 14, and the sun gear 21 of the first planetary gear mechanism 20 is formed on the tip of the connecting member 61 which is to be fixed on the shaft 15a of the motor 15.

A ring-like partition wall 11b is formed on the intermediate portion of the body member 11 of the housing 10, and a front member 12 is additionally arranged at the front portion of the body member through a gear member 19. The lock pin 18 is internally assembled into the rear portion of the partition wall 11b of the body member 11 by a metal bush 18a in a freely movable manner, and the lock pin 18 is connected with the driving plunger 18b. That is to say, the lock pin 18 can move through the driving plunger 18b between the advanced position protruding into inside the body member 11 (indicated by a full line in FIG. 14) and the retreated position (indicated by a two-dot long and two short dashes line in FIG. 14) in the surrounding wall of body member 11.

The first and second planetary gear mechanisms 20, 30 are assembled concentratedly into the rear portion of the partition wall 11b of the body member 11. The sun gear 31 of the second planetary gear mechanism 30 and the spline 31c are formed on the front surface of the carrier 23 of the first planetary gear mechanisms 20, and an another spline 52e engaging with the spline 31c is formed on the rear end of the auxiliary shaft 52. The spline 31c is tapered.

The support members 39, 35 are connected with the front and rear surfaces of the carrier 33 of the second planetary gear mechanism 30, respectively. The carrier 33, and support members 39, 35 are turnably supported against the partition wall 11b of the body member 11 and the rear member 13 using the bearings 36d, 36e, 36e. A connecting member 61 is turnably assembled into the rear support member 35 using the bearing 61b. An another support member 34a is connected with the rear surface of the ring gear 34, and the ring gear 34 is turnably assembled into the outside of the carrier 33 using roller-shaped bearings 34b, 34b.

Figure 15:
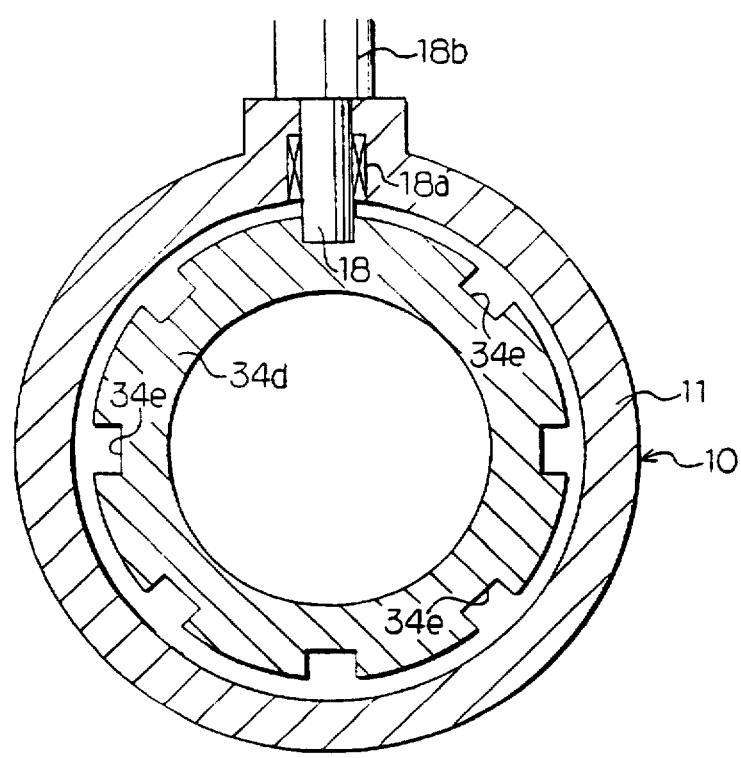
FIG. 15 is a partially-enlarged cross-sectional view of FIG. 14

A ring-like engaging member 34d is arranged at the periphery of the ring gear 34 (FIG. 14 and 15), and the engaging recesses 34e, 34e, ... that engage with the lock pin 18 are formed on the periphery of the engaging member 34d. The lock pin 18 can constrain the ring gear 34 with the engaging member 34d by moving its tip forward into an optional engaging recess 34e toward its advanced position, and can release the ring gear 34 by pulling out its tip from the engaging recess 34e toward its retreated position.

The first and second planetary gear mechanisms 20, 30 are oil-sealed with the front oil seals and rear oil seals, 20a and 20b, and 30a and 30b, respectively. The front oil seal 20a is inserted into between the external periphery of rear end of the auxiliary shaft 52 and the internal periphery of front end of the carrier 33, while the rear oil seal 20b is inserted into between the external periphery of rear connecting member 61 at the back of the bearing 61b and the internal periphery of the support member 35. The front oil seal 30a is inserted into between the external periphery of the carrier 33 in front of the bearing 34b and the front internal periphery of the ring gear 34, while the rear oil seal 30b is inserted into between the front external periphery of the support member 35 and the internal periphery of the support member 34a. That is to say, durability of the first and second planetary gear mechanisms 20, 30 can be improved by compactly assembling them into the rear portion of the housing 10 in the form of gear box, and sealing them with the front and rear oil seals, 20a, 20b, and 30a, 30b.

The turret 40 is connected with the carrier 33 through the support member 39 and the connecting members 43, 44, and 45 which are assembled into the front portion of the body member 11. The connecting member 43 is connected with the rear end surface of the connecting member 44, and spline-connected with the support member 39 through the splines 39a, 43a. The connecting member 45 is connected with the rear surface of the turret 40, and the connecting members 44, 45 are connected together through a friction-type connector 46. The connector 46 has the same structure as the connector 53 in FIG. 1, and transmits the preset rotary torque to the connecting members 44 and 45 by pressurizing them with the push ring 46a in axial direction. Concerning the connecting members 43 44, and 45, the maximum diameter portion of the connecting member 45 is put between by the front member 12 of the housing 10 and the gear member 19 through the metal bush 12a, stopped to go through by the housing 10 in the state that does not allow it to move forward/backward, and retained inside the housing 10 in a freely turnable state through the metal bush 12a, support member 39 and bearing 36d.

The gear member 41 is attached to the rear surface of the maximum diameter portion of the connecting member 45, while the gear member 16 commonly engaged with the gear members 19, 41 is connected with the front portion of the body member 11 in a back-and-forth move-free manner. The driving member 16a is connected with the rear surface of the gear member 16, and the ring member 16b retained by the connecting members 43, 44, and 45 is arranged at the back of the driving member 16a. The ring member 16b is set relatively turnable against the connecting members 43, 44, 45 and slidable against the driving member 16a. At the front external surface of the driving member 16a, a guide groove 16a1 that engages with the guide pin 11c internally extruding on the body member 11 is formed in an axial direction. At the rear surface of the driving member 16a, the bolts 16c, 16c ... that thrust through the ring member 16b are set in a back-and-forth move-free manner, and a compression spring 16d is mounted between the head of each bolt 16c and rear surface of the ring member 16b. A hydraulic chamber 16e connected to the external hydraulic source through the oil path 11d is formed at between the driving member 16a and the ring member 16b.

Then, the gear member 16 can be simultaneously engaged with the gear members 19, 41, and precisely constrain the turret 40 at a specified tool position by applying hydraulic pressure into the hydraulic chamber 16e through the oil path 11d to move the driving member 16a forward. The gear member 16 can release the turret 40 into a freely turnable state by bleeding the hydraulic chamber 16e of hydraulic pressure, and moving it backward through the compression spring 16d and the driving member 16a.

The auxiliary shaft 52 is turnably housed in the connecting member 44 through the bearings 52a, 52a. The bearings 52a, 52a are positioned by the bearing cap 52b, spacers 52c, 52c, and a circular projection 52f mounted on the auxiliary shaft 52. The auxiliary shaft 52 is connected with the sun gear 31, that is, the carrier 23 through the splines 52e, 31c, and a bevel gear 52d is additionally provided on the tip of the auxiliary shaft 52 through the push rod 52d1 and spacer 52d2.

Figure 16:
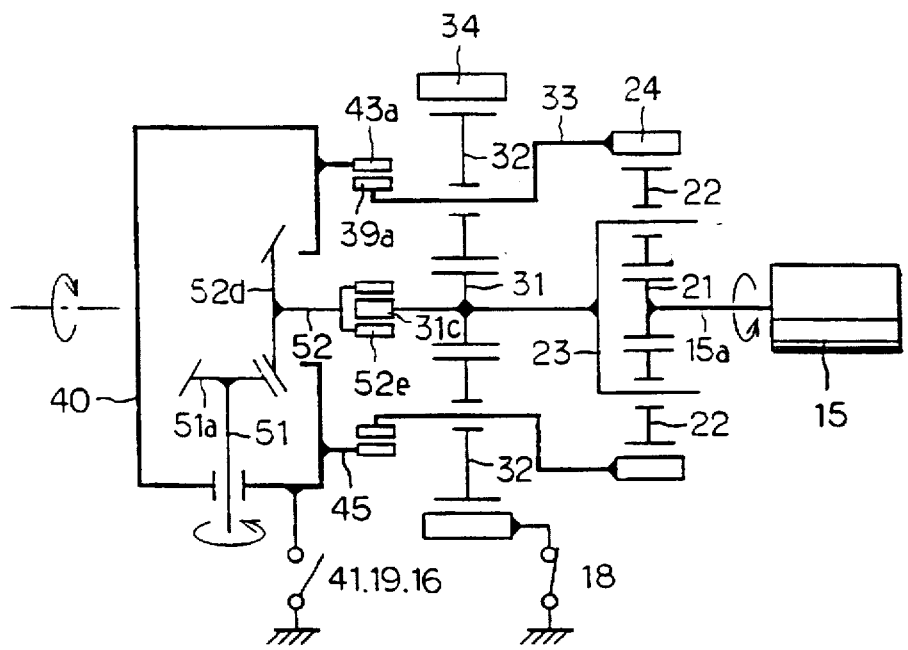
FIG. 16 is a gearing diagram of another embodiment shown in FIG. 14 for operational description equivalent to FIG. 6.

Now, when the turret 40 is released by bleeding the hydraulic chamber 16e of hydraulic pressure and the ring gear 34 is constrained by moving the lock pin 18 to the advanced position (FIG. 14), the whole device is set into the turret-turning mode (FIG. 16), and an optional tool position for the turret 40 can be selected by rotating the motor 15. At this moment, the tool driving shaft 51 inside the turret 40 idles itself through the planetary gear 32, sun gear 31, auxiliary shaft 52 and bevel gears 52d, 51a, since the ring gear 34 is constrained and the carrier 33 turns. When the tool position of the turret 40 is selected in this manner, a stationary tool corresponding to the tool position selected can be used by applying hydraulic pressure into the hydraulic chamber 16e and constraining the turret 40 with the gear member 16.

Figure 17:
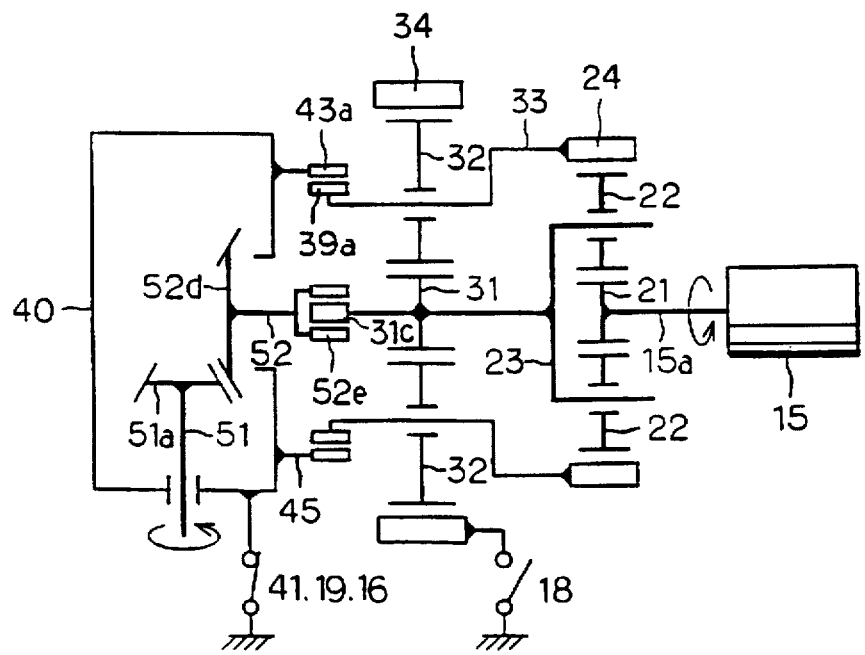
FIG. 17 is a gearing diagram of another embodiment shown in FIG. 14 for operational description equivalent to FIG. 7.

Next, the operation mode of the whole device can be shifted to the tool driving mode by moving the lock pin 18 to the retreated position to release the ring gear 34 and then activating the motor 15 (FIG. 17). In this instance, the ring gear 34 is idling itself through the planetary gear 32 because the carrier 33 remains motionless due to the constrained turret 40. The ring gear 34 may be constrained again by the lock pin 18 when the operation mode is shifted from the tool driving mode to turret-turning mode.

In this connection, the retardation ratio R34 of the ring gear 34 against the number of revolutions of the motor 15 in the tool driving mode can be expressed by the following equation:

$$R34 = 1/((1+Z3/Z1)(Z4/Z6))$$

where;

Z1: Number of teeth of the sun gear 21
Z3: Number of teeth of the ring gear 24
Z4: Number of teeth of the sun gear 31
Z6: Number of teeth of the ring gear 34

Here, when the engaging member 34d has K pieces of engaging recesses 34e, 34e, . . . , the motor 15 can be set to allow an optional engaging recess 34e to correspond to the lock pin 18 for each rotation by δR1=1/(K·R34). In this instance, the ring gear 34 can be smoothly constrained by moving the lock pin 18 to its advanced position. That is to say, the position enabling to reconstrain the ring gear 34 can be exactly located by detecting the turning angle of the motor 15.

Figure 18:
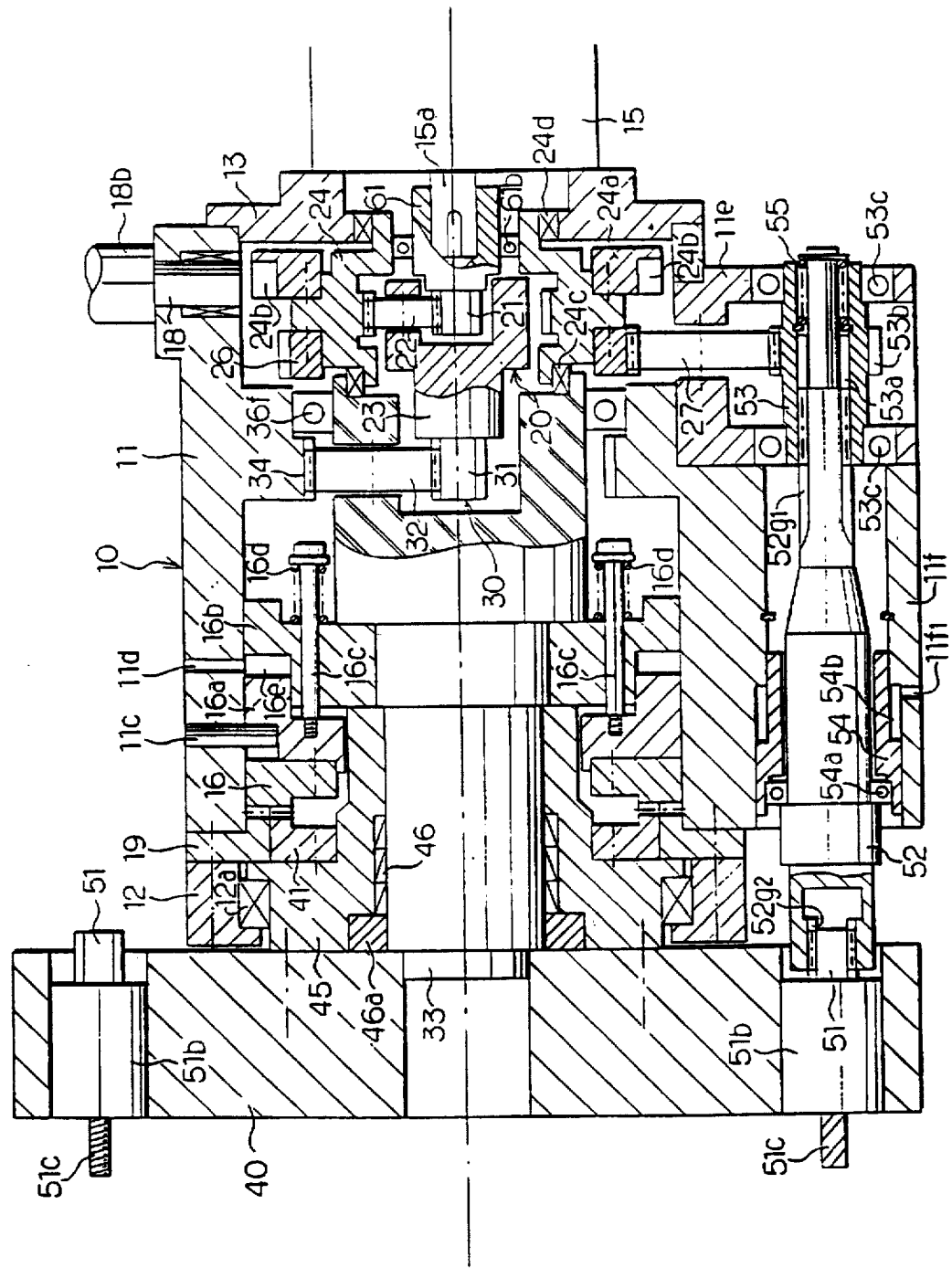
FIG. 18 is an overall schematic cross-sectional view equivalent to FIG. 1. showing a fourth embodiment

The first planetary gear mechanism 20 can be connected with the tool driving shaft 51, 51 . . . through the auxiliary shaft 52 arranged in parallel with the central turning axis of turret 40 (FIG. 18). In this instance, each tool driving shaft 51 has the rear end formed in a splined shape with external teeth, is assembled backward into the holder 51b sustaining the power tool 51c, and is arranged on the same peripheral circumference of the turret 40 by the holders 51b, 51b . . . .

The lock pin 18 is arranged at the rear portion of the body member 11 of the housing 10, and a box-like fixing member 11e is additionally provided. In addition, regarding the body member 11, a guide 11f is formed on the front surface of the fixing member 11e, and the auxiliary shaft 52 is housed turnably against the fixing member 11e and the guide 11f in a back-and-forth move-free manner.

The sun gear 21 is attached to the tip of the connecting member 61, the sun gear 31 is mounted on the front surface of the carrier 23, and the ring gear 34 is formed inside the body member 11. A ring-like engaging member 24a having the engaging recesses 24b, 24b, . . . that engage with the lock pin 18 is arranged on the ring gear 24, and a ring-like output gear 26 is additionally provided.

The connecting member 61 is housed turnably against the ring gear 24 through the bearing 61b, while the ring gear 24 is retained turnably against the carrier 33 and rear member 13 through the metal bushes 24c, 24d. Whereas, the carrier 33 is formed long enough to reach the turret 40, and the connecting member 45 to be connected with the turret 40 is connected with the front portion of the carrier 33 through the connector 46. The carrier 33 and connecting member 45 are housed turnably against the front member 12 and body member 11 through the metal bush 12a and bearing 36f. In this instance, the gear member 16 can instantly constrain the turret 40 and carrier 33 by the connecting member 45 by moving itself forward to engage with the gear members 19, 41 simultaneously. The gear member 16 can release the turret 40 and carrier 33 by retreating itself.

The ring gear 24 is connected with the spline rod 53 through the output gear 26 and side gear 27. The spline rod 53 is spline-connected with the auxiliary shaft 52. That is to say, a long spline 53a matching with the spline 52g1 formed on the rear portion of the auxiliary shaft 52 is formed on the front internal surface of the spline rod 53, while a short spline 53b engaged with the side gear 27 is formed on the central outer surface of the spline rod. The spline rod 53 is housed turnably against the fixing member 11e through bearings 53c, 53c, and the side gear 27 is retained turnably against the fixing member 11e.

A spline 52g2 with internal teeth that match with the external spline of the tool driving shaft 51 is formed on the tip of the auxiliary shaft 52. The auxiliary shaft 52 is housed turnably against the guide 11f and fixing member 11e in a back-and-forth move-free manner through the bearing 54a, driving member 54, spline rod 53, and bearings 53c, 53c. An air chamber 54b connected with the external air source is formed between the rear external periphery of the driving member 54 and front internal periphery of the guide 11f through the air path 11f1. A compression spring 55 for allowing the auxiliary shaft 52 to press backward is attached to the rear end of the auxiliary shaft 52.

Figure 19:
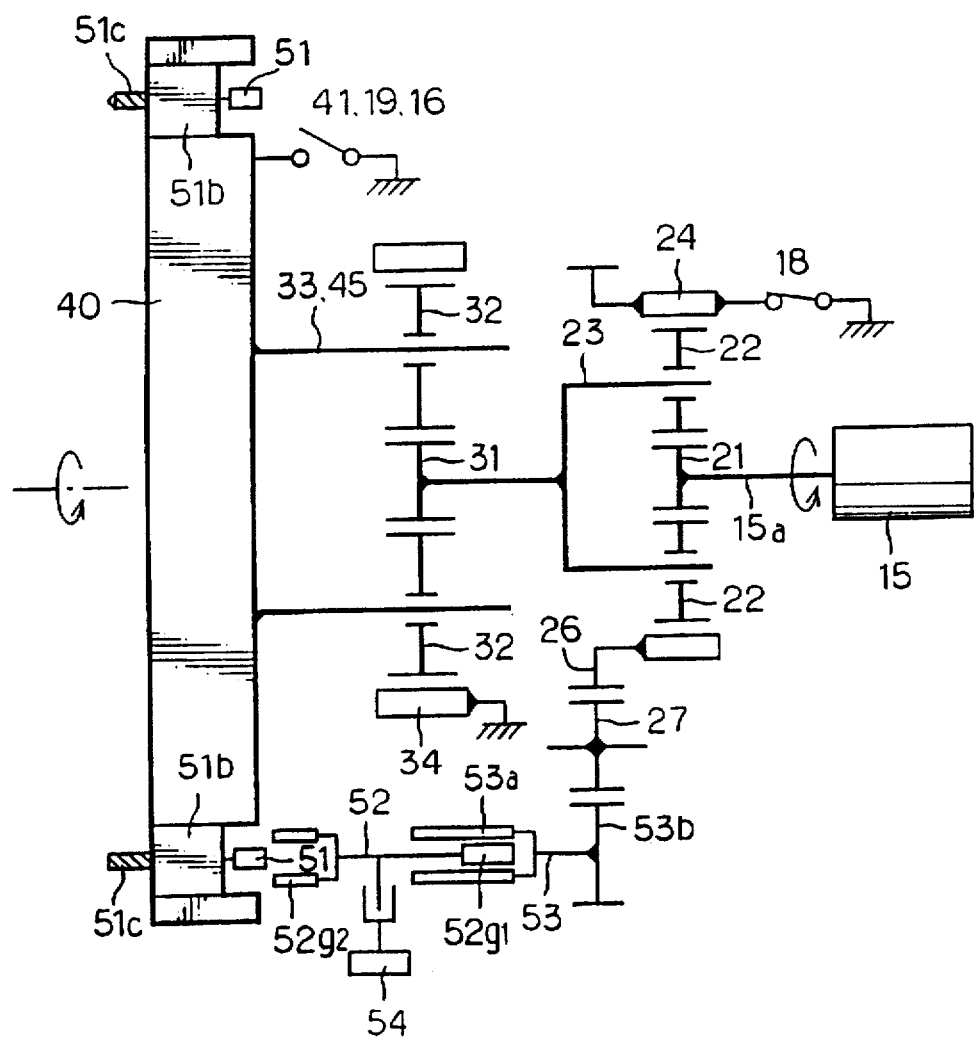
FIG. 19 is a gearing diagram of the fourth embodiment for operational description equivalent to FIG. 6.

The whole device is set into the turret-turning mode by bleeding the hydraulic chamber 16e of hydraulic pressure, moving the gear member 16 backward to release the constraint of the turret 40, driving the lock pin 18 to constrain the ring gear 24, and at the same time by releasing air pressure from the air chamber 54b and moving the auxiliary shaft 52 backward through the compression spring 55 (FIG. 19). At this moment, the tool driving shaft 51 does not turn because it is separated from the auxiliary shaft 52, and the auxiliary shaft 52 does not turn suddenly because the ring gear 24 is constrained. In this manner, a stationary tool corresponding to the tool position can be used by selecting the tool position of the turret 40 and constraining the turret 40 by the gear member 16.

Figure 20:
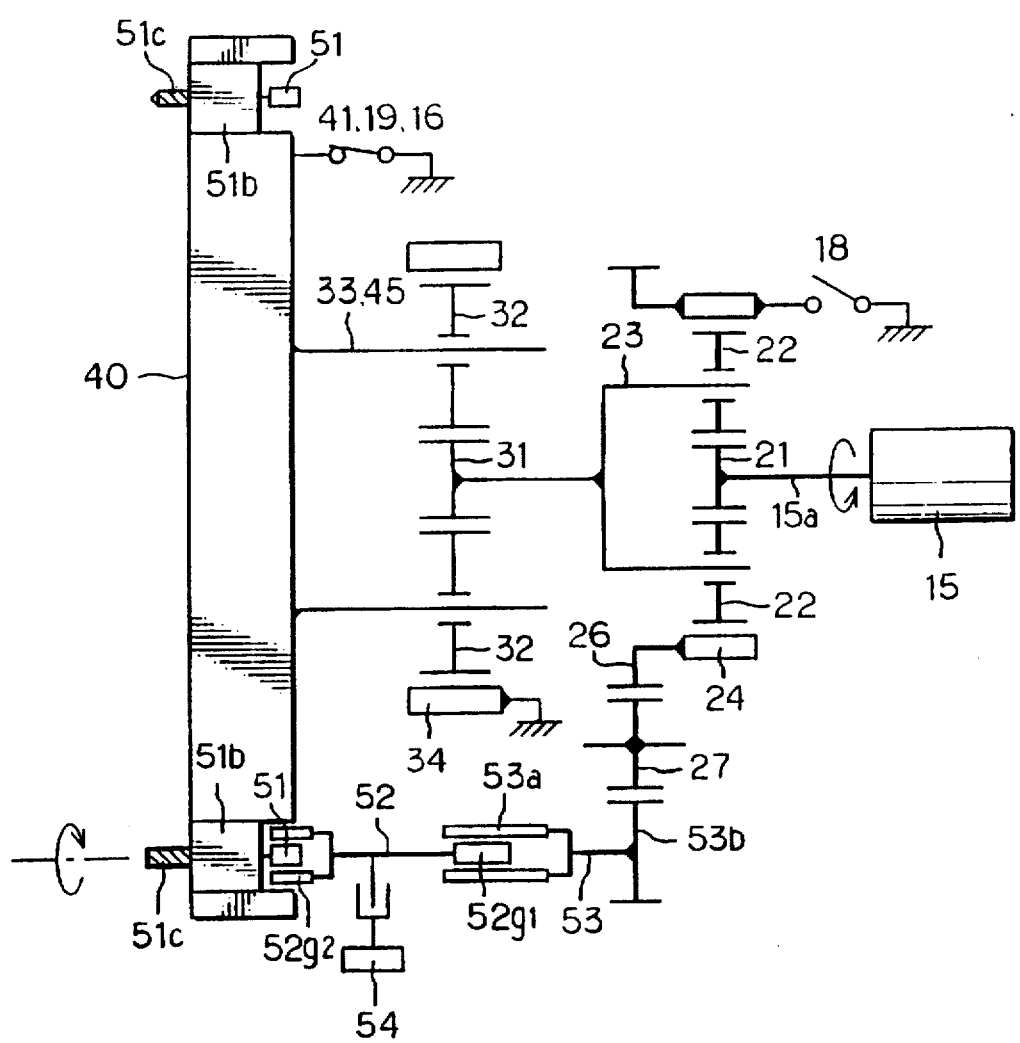
FIG. 20 is a gearing diagram of the fourth embodiment for operational description equivalent to FIG. 7.

Next, the operation mode of the whole device can be shifted to the tool driving mode by drawing back the lock pin 18 to release the ring gear 24, supplying air into the air chamber 54b, and moving the auxiliary shaft 52 forward through the driving member 54 to engage the spline 52g2 with the tool driving shaft 51 (FIGS. 20), because the rotations of the motor 15 can be transmitted to the tool driving shaft 51 through the sun gear 21, planetary gear 22, ring gear 24, output gear 26, side gear 27, spline rod 53 and auxiliary shaft 52. In this instance, the carrier 23 remains motionless since the carrier 33 and planetary gear 32 are kept motionless due to the constrained turret 40. The position enabling to reconstrain the ring gear 24 can be exactly located by detecting the turning angle of the motor 15.

In the descriptions above, the speed change gear mechanism 60 shown in FIGS. 1 and 10 can be also incorporated in FIGS. 14 and 18. Provided, however, that the speed change gear mechanism 60 allows the motor 15 to be optionally connected with the sun gear 21 or ring gear 24. In the embodiments in FIGS. 1, 9, 10, 14 and 18, the use of the tool driving shaft 51, arrangement of auxiliary shaft 52, array of the first and second planetary gear mechanisms 20, 30, controlled items and control mechanism by switching between the turret-turning mode and tool driving mode, and the use of speed change gear mechanism 60 can be selected by an optional combination in accordance with the functional combination table in FIG. 21.

Figure 22A:
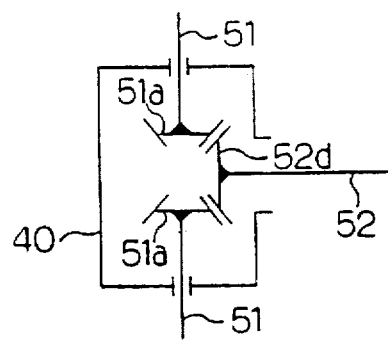
FIGS. 22A, 22B and 22C are gearing diagrams showing three alternate forms of connection of the tool driving shaft.
Figure 22B:
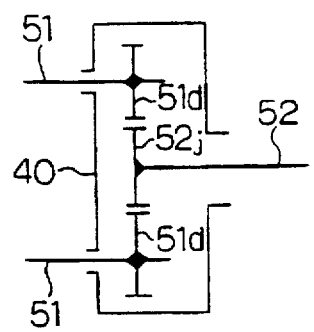
Figure 22C:
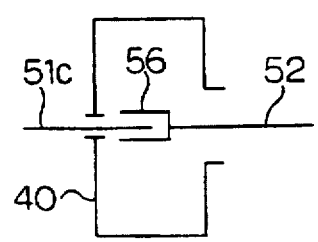

In FIGS. 1, 10 and 14, although each tool driving shaft 51 is radially assembled toward the periphery of the turret 40 through bevel gears 52d, 51a (FIG. 22 (A)), it may be, in turn, arranged in parallel with the central turning axis of the turret 40 through spur gears 52j, 51d (FIG. 22 (B)). In an another method, a female tool shank 56 may be additionally set at the tip of the auxiliary shaft 52, without using the tool driving shaft 51 (FIG. 22 (C)). This tool shank 56 allows to easily conduct high-load machining operation by directly mounting a power tool 51c on it.

Figure 23:
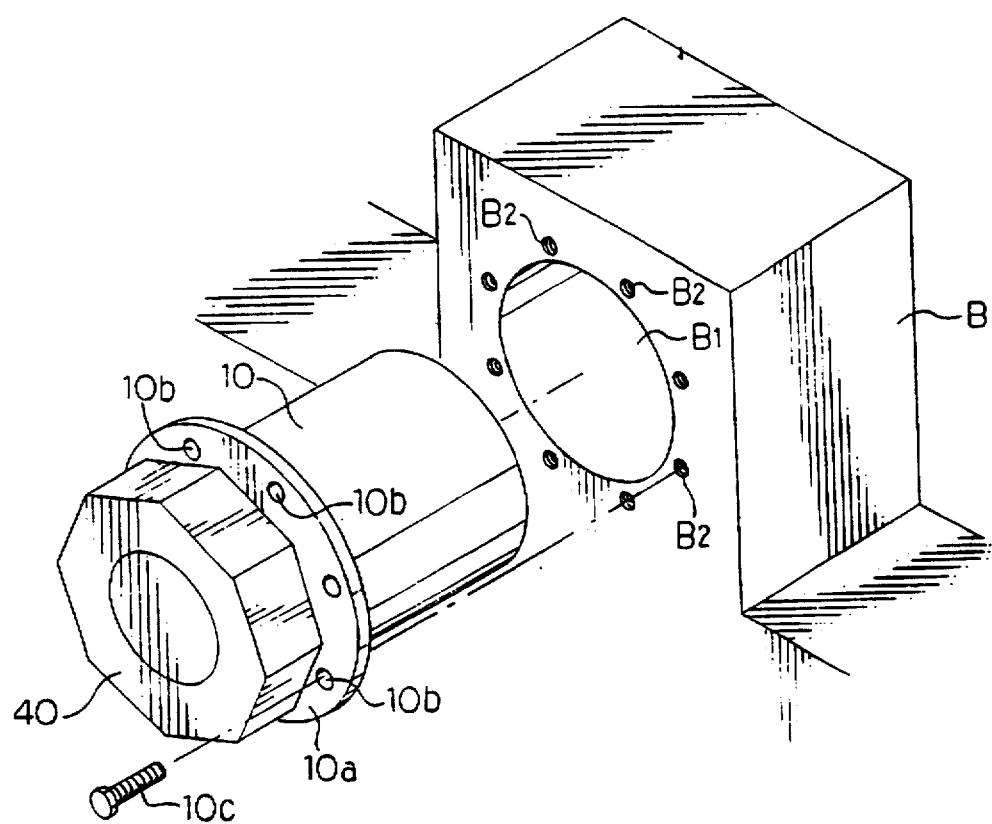
FIG. 23 is a partially-disassembled perspective view showing an a connection of a housing to a base.
Figure 24:
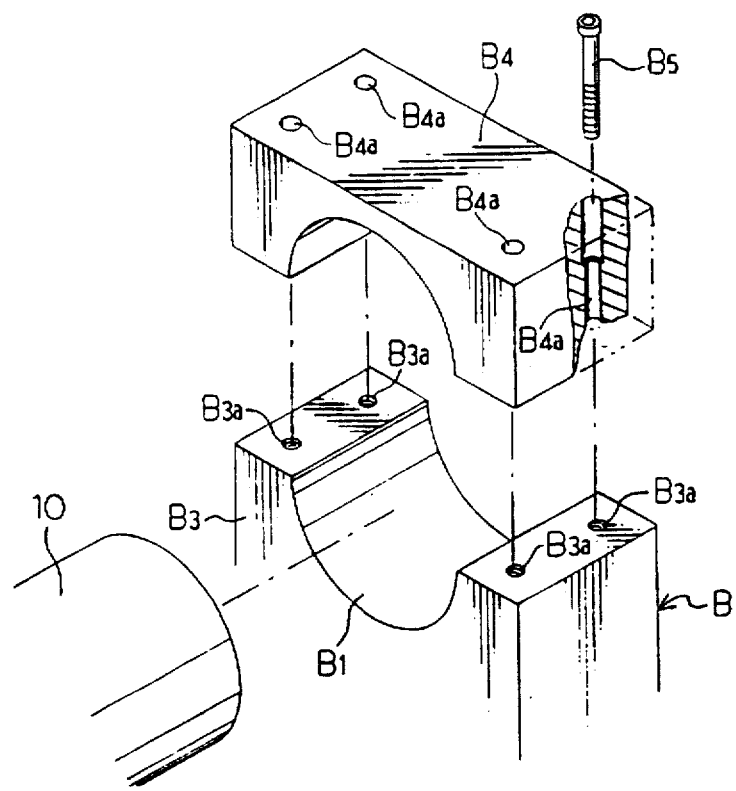
FIG. 24 is a partially-disassembled perspective view showing a connection of a housing to a base.

On the other hand, a flange 10a with bolt holes 10b, 10b, . . . may be additionally mounted in the housing 10 (FIG. 23). The housing 10 can be easily fixed by inserting its rear portion into the fitting hole B1 of the base member B of a machining tool (not shown) and screwing the bolt 10c into the corresponding screw hole B2 through the bolt hole 10b. Moreover, the base member B may be structured to have the lower member B3 and upper member B4 as if it divided the fitting hole B1 (FIG. 24) into two parts. The upper member B4 can be retained as if putting between the housing 10, which is inserted into the fitting hole B1, by screwing the bolt B5 into each screw hole B3a of the lower member B3 through stepped bolt holes B4a, B4a . . . .

The device can flexibly meet diverse needs in the applications for which no power tool is required by eliminating the tool driving shaft 51.

In the aforementioned devices in the several forms, it is possible to eliminate the tool driving shaft to yet achieve the benefit of the invention. And eliminating the tool driving shaft considerably simplifies the overall configuration of the device for the machining applications which require no power tool.

Although the present invention has been fully described by way of examples with reference to the accompanying drawings, it is to be understood various changes and modifications will be apparent to those skilled in the art without departing from the spirit and the scope of the present invention. Accordingly, the invention should not be limited by the foregoing description but rather should be defined only by the following claims.

What is claimed is:

1. A turret head device for machine tool comprising:

a housing;

a motor mounted on a rear surface of said housing;

a first and second planetary gear mechanisms, both integrated into said housing;

a turret for mounting tools, said turret being connected with said motor through said first and second planetary gear mechanisms; and, a tool driving shaft integrated into said turret and connected with the motor through said first planetary gear mechanism.

2. A turret head device for machine tool according to claim 1 wherein said housing is shaped cylindrical, and said motor, said first and second planetary gear mechanisms, and said turret are aligned with the same axis.

3. A turret head device for machine tool according to claim 2 wherein a ring gear of said first planetary gear mechanism is formed on the inner surface of a carrier of said second planetary gear mechanism and a sun gear of said second planetary gear mechanism is formed on the outer surface of a carrier of said first planetary mechanism.

4. A turret head device for machine tool according to claim 3 wherein said turret is connected with said carrier of said second planetary gear mechanism, and said tool driving shaft is connected with said carrier of said first planetary gear mechanism.

5. A turret head device for machine tool according to claim 4 wherein a ring gear of said second planetary gear mechanism is constrained or released by a clutch, while said turret can be constrained or released by interlocking with said clutch.

6. A turret head device for machine tool according to claim 1 or 2 wherein a carrier of said first planetary gear mechanism corresponds to a sun gear of said second planetary gear mechanism, and a ring gear of said first planetary gear mechanism is formed in said housing.

7. A turret head device for machine tool according to claim 1 wherein a ring gear of said second planetary gear mechanism is locked or released by a lock pin.

8. A turret head device for machine tool according to claim 2 wherein said first planetary gear mechanism is connected with said tool driving shaft through an auxiliary shaft arranged in parallel with a central turning axis of said turret.

9. A turret head device for machine tool according to claim 8 wherein a carrier of said first planetary gear mechanism corresponds to a sun gear of said second planetary gear mechanism, and a ring gear of said second planetary gear mechanism is formed on said housing.

10. A turret head device for machine tool according to claim 8 or 9 wherein a ring gear of said first planetary gear mechanism is constrained or released by a lock pin.

11. A turret head device for machine tool according to claim 1 wherein said first planetary gear mechanism is connected with said motor through a speed change gear mechanism.

12. A turret head device for machine tool according to claim 11 wherein said speed change gear mechanism optionally allows said motor to be connected with either a sun gear, carrier, or ring gear of said first planetary gear mechanism.

13. A turret head device for machine tool according to claim 12 wherein said speed change gear mechanism allows said motor to be connected with said first planetary gear mechanism at the same phase, regardless of the tool position of said turret.

* * * * *